US012735052B2

(12) United States Patent
Liu et al.

(10) Patent No.: US 12,735,052 B2
(45) Date of Patent: Sep. 15, 2026

(54) PATH PREDICTION

(71) Applicant: NVIDIA Corporation, Santa Clara, CA (US)

(72) Inventors: Shaun Liu, San Jose, CA (US); Yu Sheng, San Diego, CA (US); Amir Akbarzadeh, Alamo, CA (US)

(73) Assignee: NVIDIA Corporation, Santa Clara, CA (US)

(*) Notice: Subject to any disclaimer, the term of this patent is extended or adjusted under 35 U.S.C. 154(b) by 50 days.

(21) Appl. No.: 18/811,368

(22) Filed: Aug. 21, 2024

(65) Prior Publication Data

US 2026/0054737 A1 Feb. 26, 2026

(51) Int. Cl.

| | |
|---|---|
| ***B60W 50/00*** | (2006.01) |
| ***B60W 60/00*** | (2020.01) |
| *G05D 1/02* | (2020.01) |

(52) U.S. Cl.

CPC ...... *B60W 50/0097* (2013.01); *B60W 60/001* (2020.02); *B60W 2520/14* (2013.01); *B60W 2540/18* (2013.01); *B60W 2552/53* (2020.02)

(58) Field of Classification Search

CPC ............ B60W 50/0097; B60W 60/001; G05D 1/0214; G01C 21/34

See application file for complete search history.

(56) References Cited

U.S. PATENT DOCUMENTS

| | | | | |
|---|---|---|---|---|
| 5,508,930 A * | 4/1996 | Smith, Jr. | G01C 21/3415 73/178 R |
| 11,878,682 B2 | 1/2024 | Lee et al. | |
| 12,077,190 B2 | 9/2024 | Ng et al. | |
| 2017/0356747 A1* | 12/2017 | Iagnemma | G01C 21/3461 |
| 2019/0146508 A1* | 5/2019 | Dean | G05D 1/0285 701/26 |
| 2021/0124353 A1 | 4/2021 | Dally et al. | |
| 2021/0163010 A1* | 6/2021 | Takabayashi | G08G 1/16 |
| 2021/0269059 A1* | 9/2021 | Djuric | G01C 21/3407 |
| 2022/0105928 A1* | 4/2022 | Foil | B60W 30/18154 |
| 2023/0125581 A1* | 4/2023 | Voznesensky | G05D 1/0278 701/411 |
| 2023/0205219 A1 | 6/2023 | Towal et al. | |
| 2024/0116538 A1 | 4/2024 | Zhang et al. | |

FOREIGN PATENT DOCUMENTS

DE 102025133011 A1 2/2026

* cited by examiner

*Primary Examiner* — Tan Q Nguyen

(74) *Attorney, Agent, or Firm* — IRON SUMMIT IP LLP

(57) ABSTRACT

In various examples, probabilistic-based techniques may be used to predict intended paths of machines through an environment. For instance, various input data from perception systems, localization systems, mapping systems, and/or other sources of data may be used to determine occupant intent and compute scores associated with road segments in an environment. The scores may indicate a probability that certain road segments are part of the occupant's intended path for the machine, and the scores may be aggregated for each of the road segments across multiple instances of receiving an analyzing the input data. In some instances, a highest scoring road segment(s) may be selected as part of a predicted path of the machine. For instance, at a junction(s) where multiple road segments meet, the highest scoring road segment(s) may be selected as the predicted path.

20 Claims, 16 Drawing Sheets

PROBABILITY DISTRIBUTION 402

| | | | | | | | | |
|---|---|---|---|---|---|---|---|---|
| | INTENT 408(1) | INTENT 408(2) | INTENT 408(3) | INTENT 408(4) | INTENT 408(5) | ... | INTENT 408(N) | |
| ROAD SEGMENT 404A | SCORE 406A(1) | SCORE 406A(2) | SCORE 406A(3) | SCORE 406A(4) | SCORE 406A(5) | ... | SCORE 406A(N) | AGGREGATED SCORE 410A |
| ROAD SEGMENT 404B | SCORE 406B(1) | SCORE 406B(2) | SCORE 406B(3) | SCORE 406B(4) | SCORE 406B(5) | ... | SCORE 406B(N) | AGGREGATED SCORE 410B |
| ROAD SEGMENT 404C | SCORE 406C(1) | SCORE 406C(2) | SCORE 406C(3) | SCORE 406C(4) | SCORE 406C(5) | ... | SCORE 406C(N) | AGGREGATED SCORE 410C |
| ROAD SEGMENT 404D | SCORE 406D(1) | SCORE 406D(2) | SCORE 406D(3) | SCORE 406D(4) | SCORE 406D(5) | ... | SCORE 406D(N) | AGGREGATED SCORE 410D |
| ROAD SEGMENT 404E | SCORE 406E(1) | SCORE 406E(2) | SCORE 406E(3) | SCORE 406E(4) | SCORE 406E(5) | ... | SCORE 406E(N) | AGGREGATED SCORE 410E |
| ROAD SEGMENT 404F | SCORE 406F(1) | SCORE 406F(2) | SCORE 406F(3) | SCORE 406F(4) | SCORE 406F(5) | ... | SCORE 406F(N) | AGGREGATED SCORE 410F |
| ... | ... | ... | ... | ... | ... | ... | ... | ... |
| ROAD SEGMENT 404N | SCORE 406N(1) | SCORE 406N(2) | SCORE 406N(3) | SCORE 406N(4) | SCORE 406N(5) | ... | SCORE 406N(N) | AGGREGATED SCORE 410N |

FIGURE 4

INPUT DATA (E.G., TRAINING DATA) 504

MAP DATA 114

ROUTE DATA 116

STATE DATA 118

SENSOR DATA 120

I/O DATA 122

LOCALIZATION DATA 124

MACHINE LEARNING MODEL(S) 502

PARAMETER(S) 512

OUTPUT DATA 510

INTENT DATA 128

SCORE(S) 130

PATH PREDICTION DATA 132

GROUND TRUTH DATA 506

TRAINING ENGINE 508

700

COMPUTE A FIRST PLURALITY OF SCORES INDICATIVE OF FIRST PROBABILITIES THAT A FIRST PLURALITY OF ROAD SEGMENTS CORRESPOND TO AN INTENDED PATH OF A MACHINE, THE FIRST PLURALITY OF ROAD SEGMENTS ASSOCIATED WITH A FIRST JUNCTION
B702

COMPUTE A SECOND PLURALITY OF SCORES INDICATIVE OF SECOND PROBABILITIES THAT A SECOND PLURALITY OF ROAD SEGMENTS CORRESPOND TO THE INTENDED PATH OF THE MACHINE, THE SECOND PLURALITY OF ROAD SEGMENTS ASSOCIATED WITH A SECOND JUNCTION
B704

DETERMINE, BASED AT LEAST ON THE FIRST PLURALITY OF SCORES AND THE SECOND PLURALITY OF SCORES, A PREDICTED PATH OF THE MACHINE THAT INCLUDES AT LEAST A FIRST ROAD SEGMENT OF THE FIRST PLURALITY OF ROAD SEGMENTS AND A SECOND ROAD SEGMENT OF THE SECOND PLURALITY OF ROAD SEGMENTS
B706

PERFORM ONE OR MORE OPERATIONS ASSOCIATED WITH THE MACHINE BASED AT LEAST ON THE PREDICTED PATH
B708

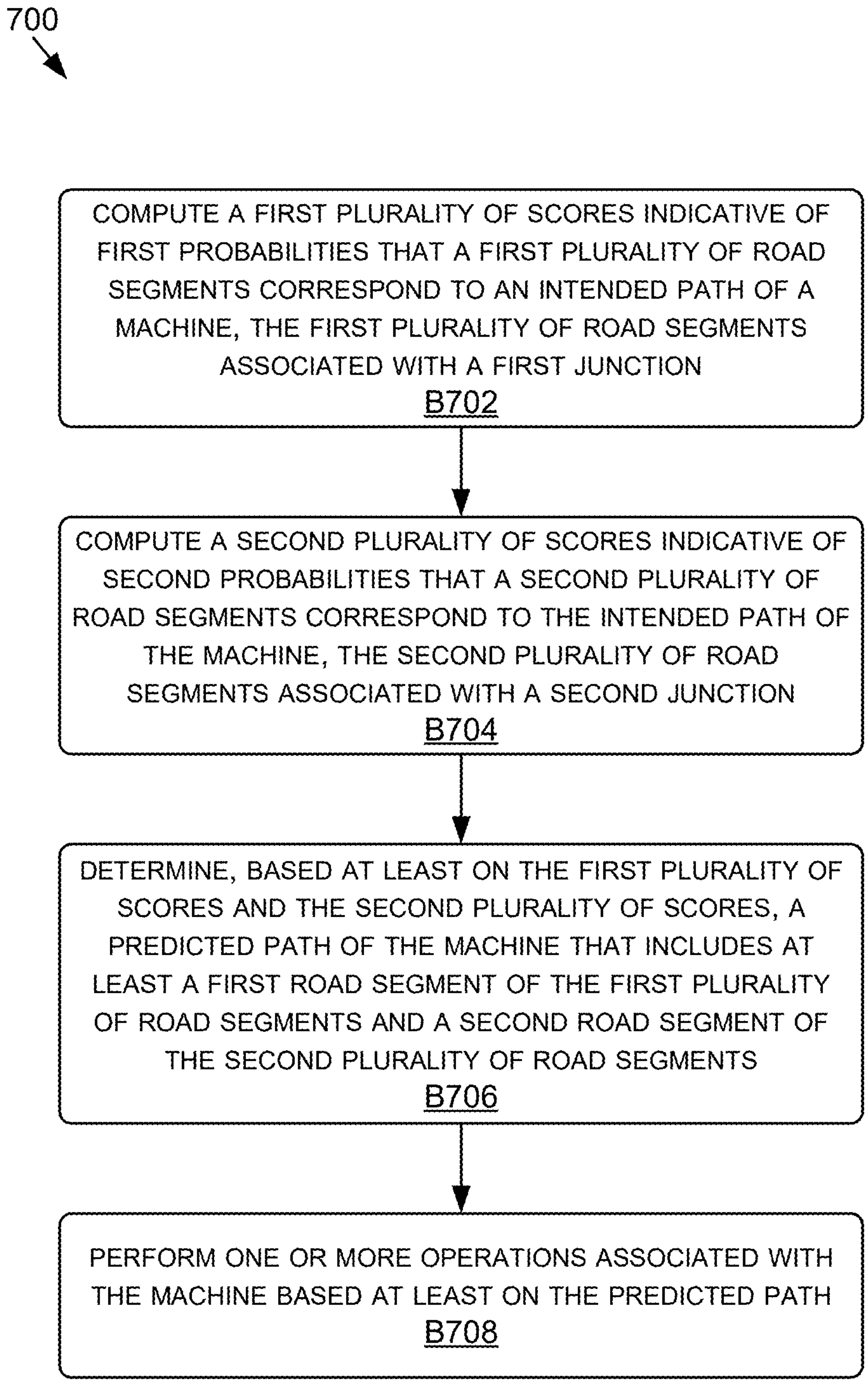

FIGURE 7

DETERMINE THAT A MACHINE IS LOCATED WITHIN A THRESHOLD DISTANCE OF ONE OR MORE JUNCTIONS INCLUDING A PLURALITY OF OPTIONS FOR A PATH OF THE MACHINE
B802

COMPUTE, BASED AT LEAST ON ONE OR MORE OCCUPANT INTENTS CORRESPONDING TO THE PLURALITY OF OPTIONS, A PLURALITY OF SCORES INDICATIVE OF WHETHER RESPECTIVE OPTIONS OF THE PLURALITY OF OPTIONS CORRESPOND TO AN INTENDED PATH OF THE MACHINE
B804

DETERMINE A PREDICTED PATH OF THE MACHINE USING THE PLURALITY OF SCORES
B806

PERFORM ONE OR MORE OPERATIONS ASSOCIATED WITH THE MACHINE BASED AT LEAST ON THE PREDICTED PATH
B808

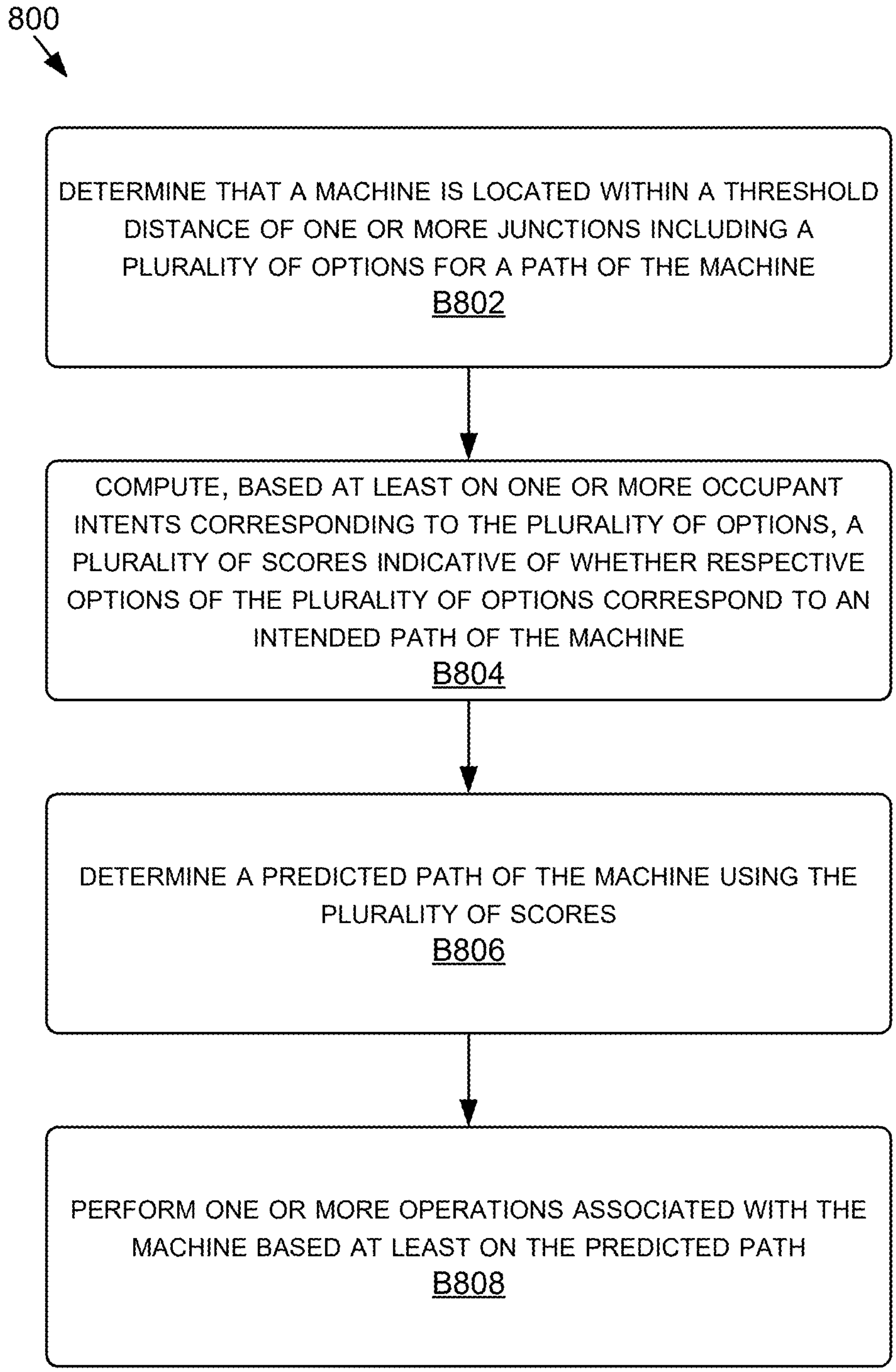

FIGURE 8

PATH PREDICTION

BACKGROUND

Accurately predicting a path of a machine (e.g., that follows occupant intent) through an environment before the machine traverses the path may be a crucial component to autonomous or semi-autonomous navigation. For instance, predicting paths ahead of time may allow various systems or components of the machine to anticipate upcoming road conditions and monitor (e.g., evaluate, confirm, adjust, etc.) speeds and/or trajectories of the machine accordingly. Additionally, precise path prediction may allow machines to make informed navigation decisions such as lane changes or turns well in advance, which may reduce the potential for abrupt maneuvers that could possibly disrupt the flow of traffic or cause adverse events.

However, accurately predicting an intended path for a machine ahead of time can be challenging. For instance, in certain situations, multiple valid paths may exist but the data relied upon to predict the intended path may be insufficient to determine which path the driver of the machine intends to use. Additionally, conventional systems may rely on rules and/or heuristics for path prediction. As a result, many cases exist where these conventional systems are unable to correctly predict the path of a machine in advance. Further, because other systems or components of the machine may use the predicted paths as inputs and rely upon accurate path predictions, issues associated with the predicted paths can cause errors for those downstream systems or components.

SUMMARY

Embodiments of the present disclosure relate to path prediction for autonomous or semi-autonomous systems and applications. For instance, systems and methods described herein may use probabilistic-based techniques to predict intended paths of machines through an environment. For instance, various input data from perception systems, localization systems, mapping systems, and/or any other sources of data may be used to determine machine occupant (e.g., driver, passenger, operator, etc.) intent and compute scores associated with road segments in an environment. The scores may indicate a probability that certain road segments are part of the occupant's intended path for the machine, and the scores may be aggregated for each of the road segments across multiple instances of receiving and analyzing the input data. In some instances, a highest scoring road segment(s) may be selected to be included as part of a predicted path of the machine. For instance, at a junction(s) where multiple road segments meet, the highest scoring road segment(s) may be selected as the predicted path.

In contrast to conventional systems, the systems of the present disclosure, in some embodiments, are able to more accurately predict the intended path of a machine using probabilistic-based techniques that are more robust, use a more simplified architecture(s), and address inherent issues commonly associated with the conventional systems. For instance, in contrast to the conventional systems, the systems of the present disclosure may compute intent scores to apply occupant intent to a plurality of junctions ahead of the machine. The junctions may include a plurality of options of different road segments the machine may use for a path, and the systems may apply the intent scores to the road segments to determine which option the occupant of the machine is intending to use. Additionally, in contrast to the conventional systems, the systems of the present disclosure may temporally aggregate and track and weight the intent scores for each of the road segments corresponding to upcoming junctions over multiple iterations or frames and select the highest scoring option(s), which may improve the stability of the predicted path and reduce flicker, while also achieving accurate path predictions that correlate with occupant intent.

BRIEF DESCRIPTION OF THE DRAWINGS

The present systems and methods for path prediction for autonomous or semi-autonomous systems and applications are described in detail below with reference to the attached drawing figures, wherein:

FIG. 4 is a visualization of an example probability distribution associated with road segments corresponding to junctions ahead of a machine, in accordance with some embodiments of the present disclosure;

FIG. 7 is a flow diagram illustrating an example of a method for predicting a path of a machine, in accordance with some embodiments of the present disclosure;

FIG. 8 is a flow diagram illustrating an example of a method for using occupant intent to score road segment junctions ahead of a machine, in accordance with some embodiments of the present disclosure;

DETAILED DESCRIPTION

Figure 1:
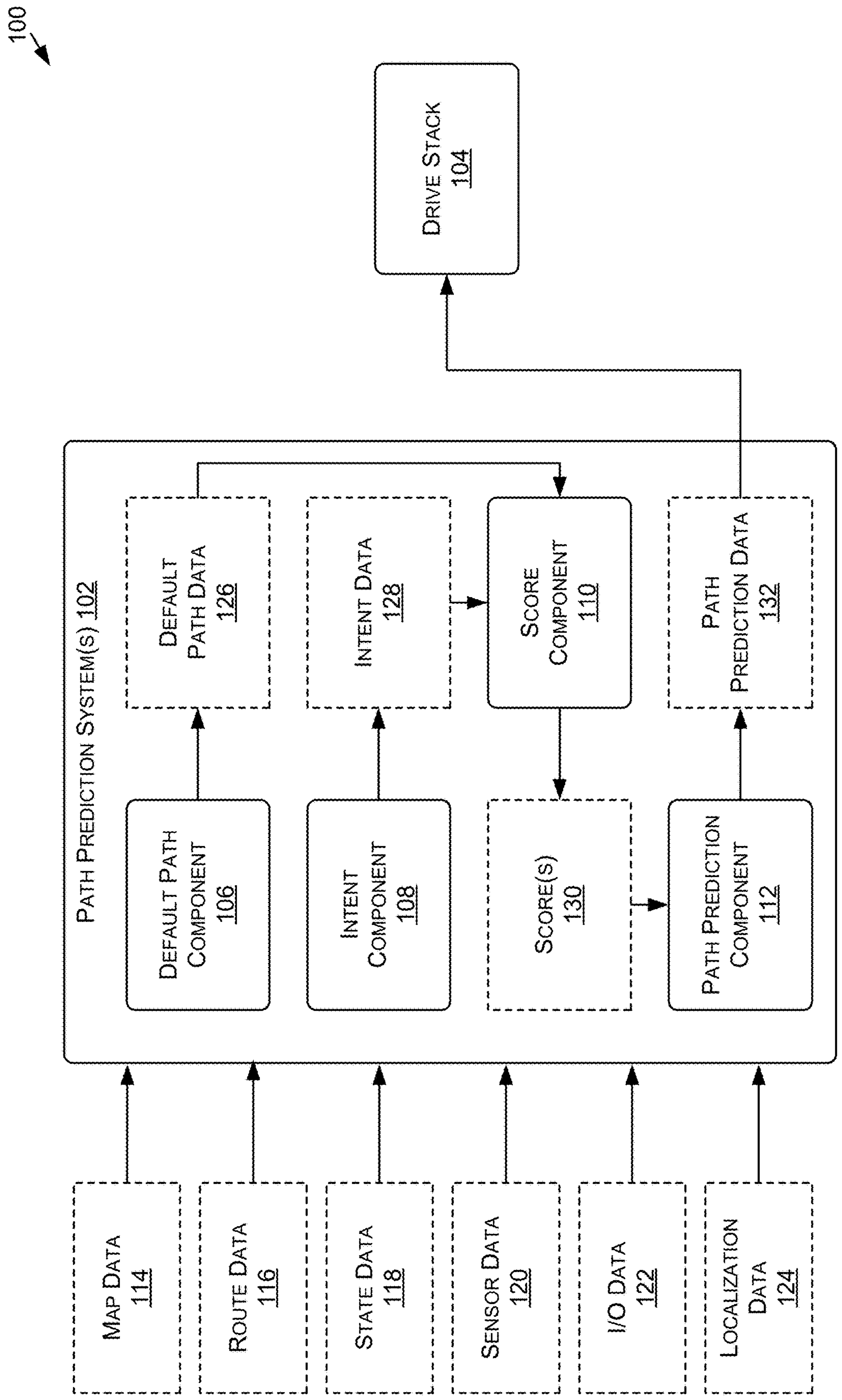
FIG. 1 illustrates an example data flow diagram for a process of path prediction, in accordance with some embodiments of the present disclosure.

Systems and methods are disclosed related to path prediction for autonomous or semi-autonomous systems and applications. Although the present disclosure may be described with respect to an example autonomous or semi-autonomous vehicle or machine 900 (alternatively referred to herein as "vehicle 900," "ego-vehicle 900," "ego-machine 900," or "machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to path prediction for vehicles or machines, this is not intended to be limiting, and the systems and methods described herein may be used in augmented reality, virtual reality, mixed reality, robotics, security and surveillance, autonomous or semi-autonomous machine applications, and/or any other technology spaces where path prediction may be used.

In some examples, the system(s) of the present disclosure may logically separate path prediction operations based on the distance of the machine to junction and/or road segments. For instance, to predict the path of the machine through junctions that are outside of a threshold distance or range (e.g., 100 meters, 200 meters, 5 seconds, etc.), the system(s) may use default path prediction logic that may not account for occupant intent. Instead, the default path prediction logic may use map data and/or other road information—such as a distance of a road segment to a defined route, road classifications (e.g., freeway, highway, arterial, etc.) turn angle between road segments, number of lanes, etc.—to determine the predicted path of the machine through these junctions. In some examples, the system(s) may use the default path prediction logic to make an initial prediction relating to the predicted path of the machine. For instance, as the machine begins to drive, occupant intent may not be available, so the system(s) may initially use the default path prediction logic to make an initial prediction for the path of the machine.

For junctions and/or road segments that are located within the threshold distance or range of the machine, the system(s) may use the probabilistic-based algorithms (or any other techniques disclosed herein) that may leverage occupant intent to predict the path of the machine. In some examples, this may include the system(s) using the probabilistic-based algorithms to evaluate the initial path prediction (based on the default logic) and determine whether the machine is likely to deviate from the initially predicted path at one or more of the junctions within the threshold distance of the machine.

For example, the system(s) may receive input data from various components or systems of the machine and use the input data to determine occupant intent(s) corresponding to an upcoming junction(s) within the threshold distance of the machine. For each road segment associated with the upcoming junction(s), the system(s) may compute one or more scores (also referred to herein as "intent scores") based on the occupant intent(s). The intent scores may indicate a probability that certain road segments are part of the occupant's intended path of the machine, and the system(s) may use the scores to select road segments for the predicted path of the machine. The system(s) may update the initial predicted path to include the road segments determined using the probabilistic-based algorithms and the road segments determined using the default algorithms for out-of-range areas.

In some examples, the input data used to determine the occupant intent(s) may include various forms of data from various systems or components of the machine. For example, the input data may include input/output (I/O) data associated with the machine. Such I/O data may indicate whether a turn signal of the machine is activated, whether a driver of the machine is using the throttle pedal or the brake pedal, steering wheel angle, etc. The I/O data may also include voice or textual inputs, such as inputs representing speech of the occupant(s). For instance, if the I/O data represents speech of an occupant saying, "turn left at X road," the I/O data may be a strong indication of the occupant intent (e.g., that the path of machine should include a left turn at X road).

In some examples, the input data may also include perception data generated using a perception system or component of the machine. The perception data may be used by the system(s) to determine occupant intent based on information associated with the environment surrounding the machine. For instance, the perception data may indicate that the machine is operating in a specific type or class of lane, such as a turning lane or, conversely, a no-turn lane, which may be strong indications of occupant intent. Additionally, or alternatively, the perception data may indicate surface markings associated with the lane or road segment of the machine, such as right turn markings, left turn markings, straight markings, or other markings (e.g., arrow marks indicating an expected path/direction of travel for machines in a lane) etc.

The input data may additionally, or alternatively, include localization data. The localization data may indicate a current location of the machine, a current pose (e.g., orientation, heading, yaw, etc.) of the machine, etc. In some instances, the localization data may be used in association with map data. For instance, the localization data and map data may be used to indicate a location, pose, etc. of the machine with respect to a map of the environment. In some examples, the localization data and/or the map data may be used to detect lane changes of the machine, which may also be strong indicators of occupant intent (e.g., changing lanes to exit a highway, turn onto a different road, etc.).

While machine I/O data, perception data, localization data, and/or map data are just a few examples of the input data that may be used by the system(s) to determine occupant intent and/or predict the path of the machine, in additional or alternative examples, any other types of data may additionally or alternatively be used by the system(s) for these purposes, as described in greater detail herein. For instance, the input data may include, but is not limited to, machine I/O data, perception data, localization data, map data, sensor data (e.g., raw or processed image data, LIDAR data, RADAR data, ultrasonic data, audio data, etc.), route data, machine state data, road marking data, and/or lane marking data.

As described herein, in various examples, the system(s) may use the map data, localization data, and/or perception data to determine whether the machine is within a threshold distance of a junction(s) (e.g., one or multiple junctions). The junction(s) may include one or more options for the machine to deviate from its initial or otherwise previously predicted path. For instance, the predicted path of the machine may include a first road segment connected to at least a first junction of the junction(s), but one or more second road segments may also be connected to the first junction. Accordingly, the system(s) of the present disclosure may use the input data to compute scores (also referred to herein as "intent scores") for the first road segment and the one or more second road segments of the first junction. The scores may represent probabilities, based at least on occupant intent and/or other factors, of the first road segment and the one or more second road segments being part of an intended path of the machine (e.g., the occupant's intended path of the machine).

In some examples, the system(s) may apply the scores to the road segments of the junctions differently based on whether the occupant intent corresponds to a specific road segment. For instance, the system(s) may compute confidence scores for the occupant intents. The confidence scores may, in at least some examples, indicate a confidence of whether an occupant intent applies to a specific road segment. Take, for example, a scenario in which a machine is approaching two junctions along a straight path. At the first junction of the two junctions, the machine may either continue straight to the second junction or turn onto a different path and avoid/miss the second junction. If the occupant of the machine activates the machine's turn signal prior to reaching the first junction, it may be difficult to determine whether the occupant intent (e.g., the turn signal) should apply to the first junction or the second junction. In other words, based on the turn signal alone, it may be hard to determine whether the occupant intends to turn at the first junction or turn at the second junction. In such scenarios, the system(s) of the present disclosure may compute confidence scores for whether the occupant intent applies to the first road segment associated with the machine turning at the first junction or whether the occupant intent applies to the second road segment associated with the machine turning at the second junction. The system(s) may then apply the confidence scores to the scores for the different road segments, so that the intent is applied to each road segment but potentially in different proportions. For instance, if the speed of the machine is high and decelerating to turn at the first junction may be difficult, the system(s) may assign a higher confidence to the occupant intent applying to the second road segment associated with the machine turning at the second junction. As another example, past occupant behavior may be factored in. For example, where two junctions are upcoming, and a turn signal is on, the uses of the second junction during one or more prior trips may be factored in to the score for the first and second junction. In some examples, weights may be tracked over time for different junctions, so that repetitive use may have a higher weight on a particular junction than a junction that has never been used before.

Additionally, in some examples, the systems may apply multiple scores associated with occupant intent to multiple road segments being evaluated as options for the predicted path, as well as aggregate the scores over multiple frames/instances. For example, consider a junction that is associated with a first road segment for continuing straight and a second road segment associated with turning right at the junction. If the system(s) detects a right turn signal of the machine has been activated, the system(s) may apply a first intent score to the second road segment associated with turning right. If the system(s) also detects the machine is in a dedicated right-turn lane, the system(s) may apply a second intent score to the second road segment. The system(s) may add the first intent score and the second intent score together, and if the aggregated intent score for the second road segment is greater than for the first road segment, the system(s) may predict the path of the machine to include the second road segment. Additionally, as the system(s) obtains additional, new data the system(s) may use the new data to compute the intent scores again for each of the road segments and aggregate the new intent scores with the previous intent scores, creating a running total. In some examples, the system(s) may apply different weights or priorities to certain occupant intents.

As described herein, in some examples, the system(s) may determine the predicted path (e.g., predict the occupant's intended path) of the machine using the scores for the road segments associated with the junctions that are located within the threshold distance of the machine. For example, the system(s) may select the road segment(s) having the highest intent score to be included as part of the predicted path. In some examples, the system(s) may select the road segment(s) in a descending order based on the order of the junction(s). For instance, the system(s) may first select a first road segment corresponding to a first junction, which may be the closest or next junction. The system(s) may then select a second road segment corresponding to a second junction, which may be the next junction following the first junction and the first road segment, and so forth until the predicted path is determined. Additionally, in some instances, once no junctions and/or road segments remain that are in range, the system(s) may use the default logic to determine any remaining portions of predicted path following the in-range junctions and/or road segments.

In some examples, the system(s) may generate one or more outputs based at least on determining the predicted path of the machine. For instance, in addition to—or in the alternative of—outputting the predicted path of the machine, the system(s) may additionally or alternatively output one or more road transition types (e.g., an array illustrating how each road segment in the predicted path is linked, indicating either a turn or a straight connection), one or more route input statuses (e.g., revealing whether a navigation route has been established and/or whether the predicted path adheres to this route), one or more map identifiers (e.g., to ensure that downstream systems or components are using the same map as the path prediction system(s)), one or more map timestamps (e.g., timestamps for when the map is generated), one or more lane graph timestamps, and/or one or more predicted lane rails.

In some examples, the system(s) may use the predicted path and/or the other outputs as inputs for performing one or more additional operations associated with the machine. As an example, the system(s) may determine road curvature and fuse the curvature of the machine's trajectory at the junctions and, in some instances, recompute curvatures already provided in map data based on the predicted path. As another example, the system(s) may perform localization using the predicted path to determine which road segment the machine is operating on. As yet another example, the system(s) may use the predicted path to access map data attributes along the predicted path to resolve speed limit conflicts with perception results. In even further examples, the system(s) may obtain events, such as T junctions and toll booths, along the predicted path.

In various examples, the system(s) may cause the machine to perform one or more operations based at least on the predicted path of the machine and/or any of the other outputs or operations described herein. For instance, the system(s) may use the predicted path, curvatures, speed limits, etc. to determine whether additional braking or acceleration is needed for the machine. As one example, the predicted path may indicate the machine is merging onto a highway or freeway, and the system(s) may apply additional acceleration to bring the machine up to speed for the merge. As another example, the predicted path may indicate the machine is going to make a sudden turn, and apply additional braking to ensure the machine makes the turn at a comfortable and/or safe speed. In some examples, the system(s) may communicate the predicted path of the machine to one or more other machines, such as a machine(s) operating in a near vicinity of the machine or having a trajectory that intersects or is nearby the predicted path of the machine.

In some embodiments, the systems and methods described herein may be performed within a simulation environment (e.g., NVIDIA's DriveSIM) using simulated data (e.g., simulated sensor data of simulated sensors of a virtual or simulated machine). For example, simulated input data (e.g., map data, perception data, machine I/O data, or any other input data described herein) may be used to determine and score road segments/junction based on occupant intent within the simulation environment, and this information may be used to perform operations (e.g., accelerate, decelerate, fuse curvature, etc.) associated with the virtual machine within the environment. These simulated operations may be used to test performance of the underlying algorithms, systems, and/or processes prior to deploying them in the real-world. In some instances, the simulation may be used to generate synthetic training data—e.g., training data indicative of occupant intent, map data, etc. from within the simulation. The synthetic training data (in addition to or alternatively from real-world data) may then be processed to determine a predicted path of a machine in the environment, such as a path of a machine through a warehouse, for example. In any example, such as where a simulation environment is used for testing, validation, training, etc., the simulation environment and/or associated training data may be rendered or otherwise generated using one or more light transport algorithms-such as ray-tracing and/or path-tracing algorithms.

In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems-such as systems for testing, validating, training (e.g., machine learning models, neural networks, etc.), and/or other tasks related to automotive, robot, machine, or other applications. In some examples, the simulation environment may include a digital twin of a real environment, such as a digital twin of a specific stretch of roadway, a warehouse, a data center, an airport, a geographic area, a marine area, or any other real environment where autonomous or semi-autonomous machines may operate.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications. For instance, the systems and methods of the present disclosure may be used in an acronautical or aviation context to communicate a predicted path of an aircraft to other aircrafts or air traffic controllers.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models, such as large language models (LLMs), vision language models (VLMs), and/or multi-modal language models, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process of path prediction, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 may be implemented using, amongst additional or alternative components, a path prediction system(s) 102 and a drive stack 104. The path prediction system(s) 102 may include, amongst additional or alternative components, a default path component 106, an intent component 108, a score component 110, and a path prediction component 112. The path prediction system(s) 102 may be running on one or more computing devices of a machine, such as an autonomous or semi-autonomous vehicle.

As an overview, the process 100 may include the path prediction system(s) 102 receiving, amongst additional or alternative input data, one or more of map data 114 representing one or more maps of an environment, route data 116 representative of one or more routes (e.g., predefined routes) of the machine, state data 118 representative of one or more states associated with the machine, sensor data 120 (e.g., image data, LiDAR data, RADAR data, ultrasonic data, audio data, etc.), I/O data 122 indicative of one or more inputs and/or outputs of the machine, localization data 124 indicative of one or more of a location, pose, current road segment, prior behavior data, etc. of the machine. Using at least some of the input data, the default path component 106 of the path prediction system(s) 102 may determine one or more default paths of the machine, which may be represented using the default path data 126. Additionally, the intent component 108 may use at least some of the input data to determine one or more occupant intents, which may be represented using the intent data 128. The score component 110 may use the intent data 128 to compute one or more scores 130 for road segments in the environment that may potentially be used as a path for the machine, including the road segment(s) of the default path(s). The path prediction component 112 may use the score(s) 130 to determine a predicted path(s) for the machine, which may be represented using the path prediction data 132. The path prediction system(s) 102 may provide the path prediction data 132 to the drive stack 104, which may use the predicted path(s) as an input(s) to one or more other algorithms or processes, and/or well as for performing one or more operations associated with the machine.

Figure 2:
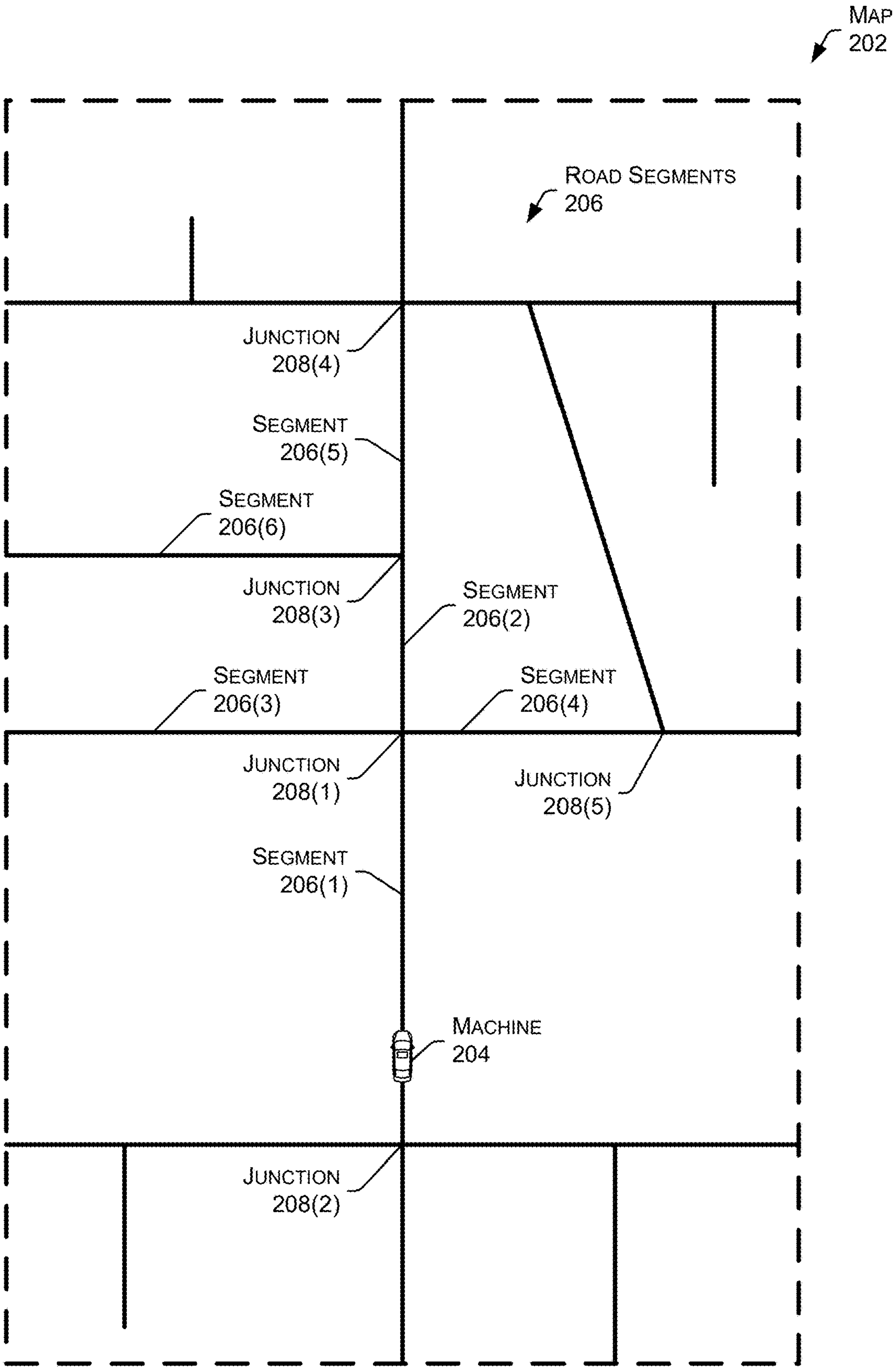
FIG. 2 illustrates an example map of an environment and machine that is localized with respect to the map, in accordance with some embodiments of the present disclosure.

In some examples, the map data 114 may represent one or more maps of the environment the machine is operating in. The map data 114 may correspond to standard definition (SD) maps of the environment or may correspond to high-definition (HD) maps of the environment. In various examples, the system(s) of the present disclosure may use SD maps of the environment to predict machine paths. For instance, FIG. 2 illustrates an example of a map 202 of an environment, as well as a machine 204 that is localized with respect to the map 202, in accordance with some embodiments of the present disclosure. The map 202 may include a plurality of road segments 206. Each of the road segments 206(1)-206(6), may represent individual portions of a driving surface between a pair of junctions 208(1)-208(5). For instance, the map 202 may include a first road segment 206(1) (e.g., a current road segment of the machine 204) between a first junction 208(1) and a second junction 208(2), a second road segment 206(2) between the first junction 208(1) and a third junction 208(3), a third road segment 206(3) connected to the first junction 208(1), and so forth as illustrated in the example of FIG. 2.

In some examples, the machine 204 may correspond to the machine 900 described herein. The machine 204 may include any of the components described herein. For instance, the machine 204 may include a localization component that determines the location, pose, etc. of the machine with respect to the map 202. In some examples, the machine 204 may include one or more of the components and systems described in the example of FIG. 1, and may use these systems and components to predict the path of the machine 204.

Referring back to the example of FIG. 1, the path prediction system(s) 102 may use the default path component 106 to predict the path of the machine through junctions that are outside of a threshold distance or range (e.g., 100 meters, 200 meters, 5 seconds, etc.), as well as for making initial predictions regarding the path of the machine (e.g., before occupant intent is able to be determined). In some examples, the default path component 106 may determine the default path data 126 using the map data 114, the route data 116, the state data 118, the localization data 124, and/or any other of the input data. The default path component 106 may determine an initial predicted path of the machine (e.g., with minimal occupant intent and/or without accounting for occupant intent) based on a number of factors and/or rules.

In some instances, to predict out of range portions of a path and/or predict initial paths (also referred to herein as "default paths"), the default path component 106 may rank or assign priority to prospective road segments based on a road segment's distance to a set route, a form of way (e.g., classification, such as freeway, highway, etc.) associated with a road segment, turn angle between successive road segments, and/or number of lanes of each road segment. For example, if a route is set between two locations, the default path may include road segments that are closest to the route. If the route is not set, the default path component 106 may select the road segments having the highest form of way priority as the default path. In some examples, if all successor road segments (road segments following another road segment) have the same form of way priority, the default path component 106 may select the road segments for the default path that have the smallest turn angle. As an example, the default path component 106 would select a path that goes straight through a junction over a path that includes some degree of turn at the junction. In some instances, if successor road segments have the same or similar turn angles, the default path component 106 may select the road segment having the highest lane count (e.g., select a road segment having two lanes over a road segment with one lane).

Figure 3A:
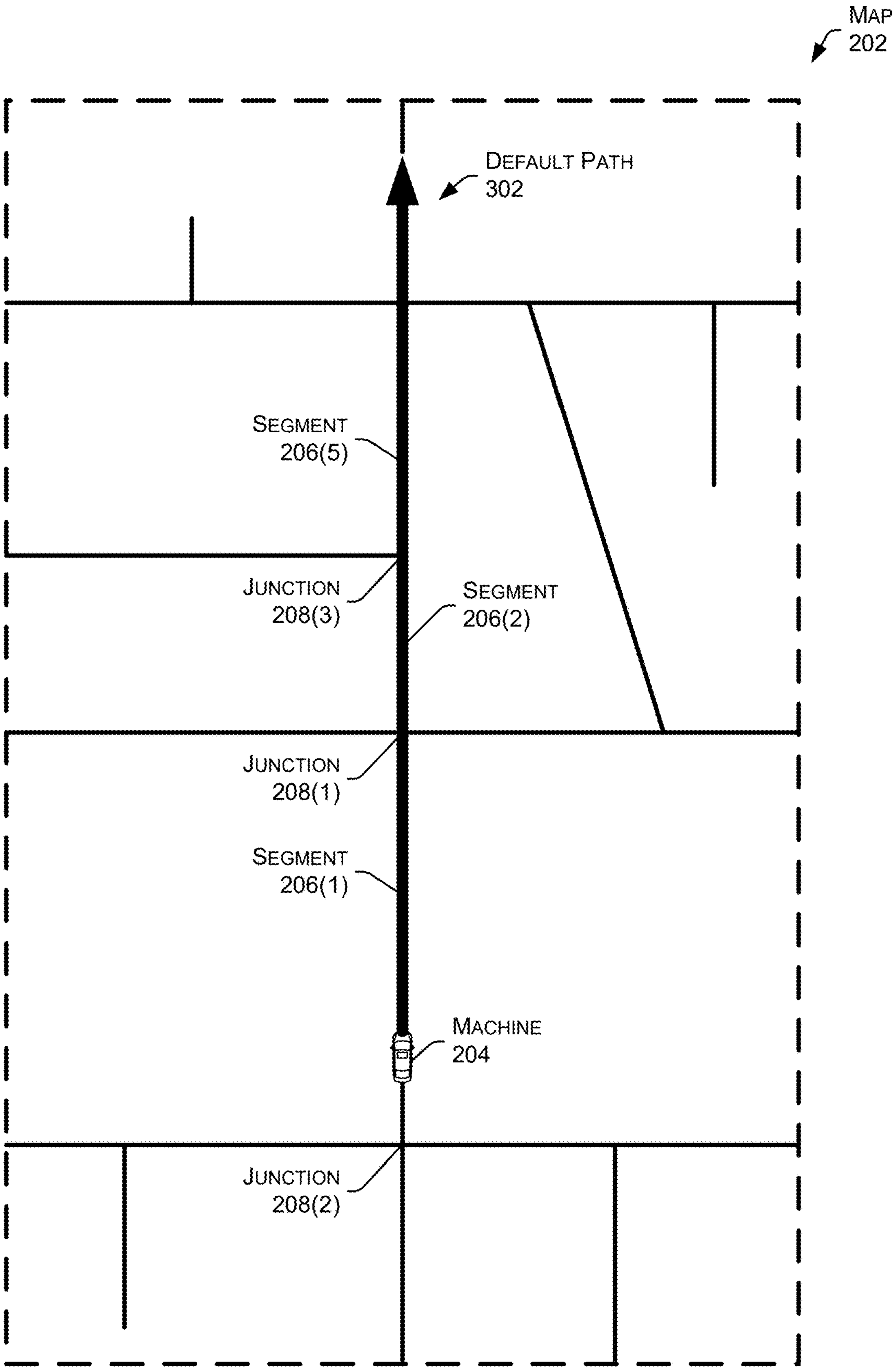
FIG. 3A illustrates an example of a default path of the machine, in accordance with some embodiments of the present disclosure.

For instance, FIG. 3A illustrates an example of a default path 302 of the machine 204, in accordance with some embodiments of the present disclosure. As shown, the default path 302 may be a straight path based on the default logic described above and herein. For instance, the default path 302 includes the first road segment 206(1), the second road segment 206(2), and the fifth road segment 206(5). In some examples, the default path component 106 may determine the road segments 206 of the default path 302 using the rules described above. For instance, the first segment 206(1), the second segment 206(2), and the fifth segment 206(5) may have a form of way corresponding to a highway or freeway, while the other road segments perpendicular may be exits or side roads. Additionally, or alternatively, the first segment 206(1) and the second segment 206(2) may have a 0-degree or otherwise low-degree turn angle at the first junction 208(1), and the second segment 206(2) and the fifth segment 206(5) may also have a 0-degree or low-degree turn angle at the third junction 208(3). In various examples, the default path data 126 may include a list of road segment identifiers that correspond to the first segment 206(1), the second segment 206(2), and the fifth segment 206(5). In some examples, the default path component 106 may use the default algorithm techniques described above and herein to score each of the road segments when determining the default path 302, and the highest scoring segments may be used for the default path 302.

Referring back to the example of FIG. 1, the process 100 may also include the intent component 108 of the path prediction system(s) 102 determining the intent data 128 corresponding to junctions and/or road segments that are located within the threshold distance or range of the machine. The intent data 128 may indicate occupant intents associated with the path of the machine. That is, the intent data 128 may indicate the likelihood or probability that an occupant (e.g., driver, passenger, remote operator, etc.) of the machine intends for the path of the machine to include a certain road segment. For instance, while the default path may indicate a most likely path of the machine based on road geometry, route, type or class of roads (e.g., preferring freeways or highways over regular streets), and/or other factors, the intent data 128 may indicate which road segments in the environment that the occupant of the machine may actually intend to use for the path.

In some examples, occupant intents may include, but are not limited to, a yaw rate of the machine, whether or not a turn signal of the machine is activated, lane changes, lane assignment (e.g., what lane the machine is localized to), detected arrow marks in lanes, perceived path of the machine, a steering angle associated with the machine, whether the machine is operating in a dedicated lane, etc. For example, the intent component 108 may detect lane change intent if the machine is operating on a multi-lane road segment and a perception system or other component of the machine determines a lane change is in progress. As another example, the intent component may detect the occupant's intent to turn at an intersection or exit a freeway if the turn signal is activated.

In some examples, the intent component 108 may determine the intent data 128 based on various inputs. For instance, the intent component 108 may use one or more of the map data 114, the route data 116 the state data 118, the sensor data 120, the I/O data 122, prior behavior data, and/or the localization data 124 to determine the intent data 128. For example, the intent component 108 may use the I/O data 122 associated with the machine to determine whether a turn signal of the machine is activated, whether a driver of the machine is using the throttle pedal or the brake pedal, a steering wheel angle of the machine, etc. The I/O data 122 may also include voice or textual inputs, such as inputs representing speech of the occupant(s). For instance, if the I/O data 122 represents speech of an occupant saying, "turn left at X road," the I/O data may be a strong indication of the occupant intent (e.g., that the path of machine should include a left turn at X road).

In some examples, the input data may also include perception data (not shown) generated using a perception system or component of the machine. The perception data may be used by the intent component 108 to determine occupant intent based on information associated with the environment surrounding the machine. For instance, the perception data may indicate that the machine is operating in a specific type or class of lane, such as a turning lane or, conversely, a no-turn lane, which may be strong indications of occupant intent. Additionally, or alternatively, the perception data may indicate surface markings associated with the lane or road segment of the machine, such as right turn markings, left turn markings, straight markings, or other markings (e.g., arrow marks) etc. For example, where perception data indicates that the machine is traveling in a lane with double white lines on each side (e.g., meaning no ingress or egress from the lane), the intent to stay in the lane may be increased, while the intent to enter other lanes that may lead to a junction may be decreased.

In some examples, the localization data 124 may indicate a current location of the machine, a current pose (e.g., orientation, heading, yaw, etc.) of the machine, etc. In some instances, the localization data 124 may be used in association with the map data 114. For instance, the localization data 124 and map data 114 may be used to indicate a location, pose, etc. of the machine with respect to a map of the environment, such as the map 202. In some examples, intent component 108 may use the localization data 124 and/or the map data 114 to detect lane changes of the machine, which may also be strong indicators of occupant intent (e.g., changing lanes to exit a highway, turn onto a different road, etc.). Additionally, or alternatively, the intent component 108 may determine which road(s) to associate occupant intent with based at least on detecting lane changes. For instance, if the intent component 108 detects a lane change of the machine, the intent component 108 (and/or the score component 110) may determine that a turn signal of the machine is being used for the lane change, and that the turn signal may not indicate the occupant's intent to turn onto a different road, etc.

Figure 3B:
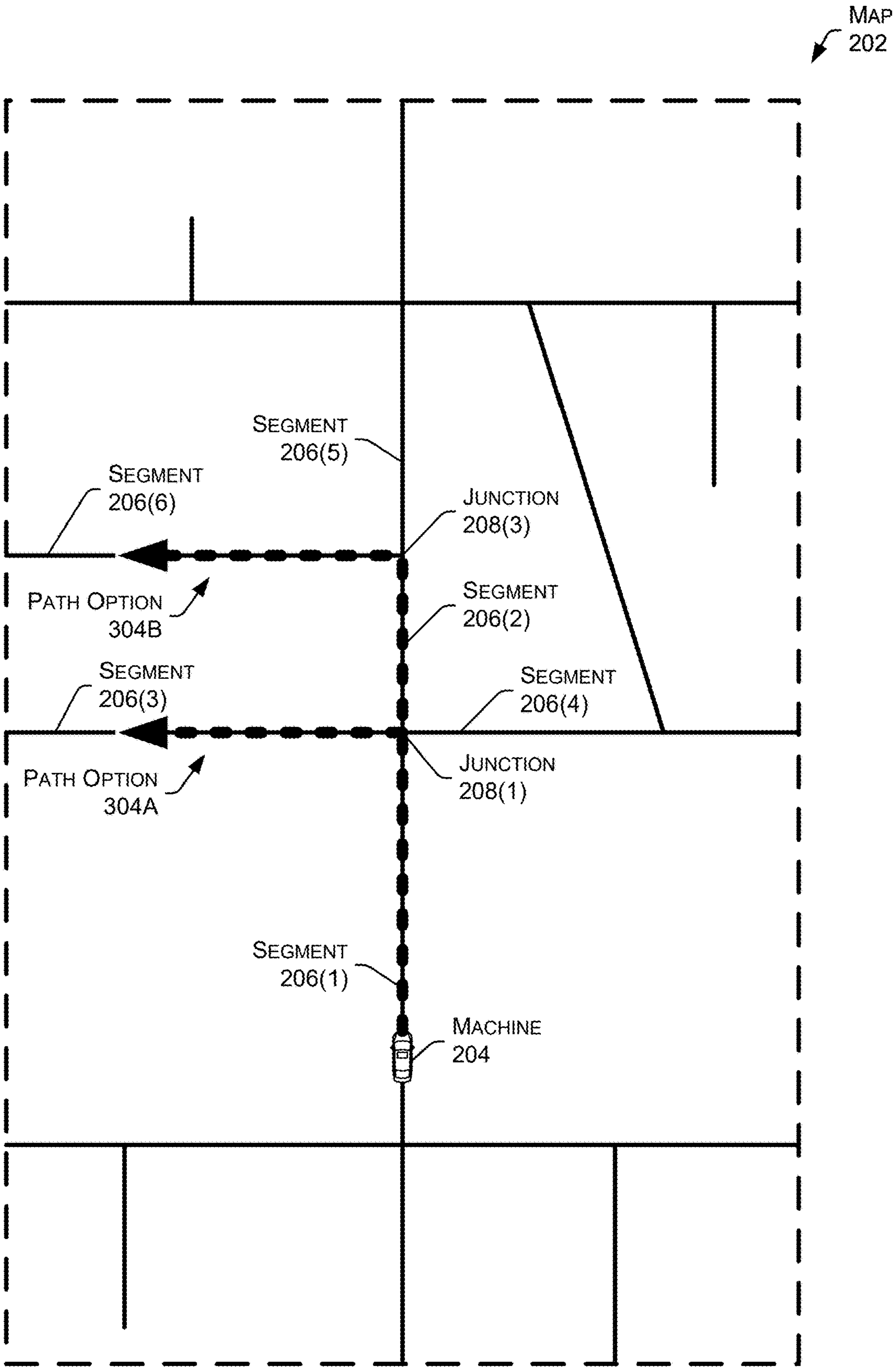
FIG. 3B illustrates an example of path options for the machine, in accordance with some embodiments of the present disclosure.

In some examples, the intent data 128 and/or specific occupant intents detectable by the intent component 108 may be applicable to one or multiple road segments and/or junctions in the environment. As an example, a turn signal of a machine may indicate the machine is intending to make a turn, however, the turn signal may not indicate the specific road the machine intends to turn onto. For instance, FIG. 3B illustrates an example of different path options for the machine, in accordance with some embodiments of the present disclosure. The path options illustrated in the example of FIG. 3B include a first path option 304A and a second path option 304B, which could both be valid options as an intended path of the machine 204 in scenarios where the intent data 128 indicates a future left turn is intended. For instance, if the machine 204 (and/or an occupant of the machine 204) activates a left turn signal, the left turn signal may be used to determine the intent is to turn left at either the first junction 208(1) or the third junction 208(3). In some examples, and as described in greater detail herein, additional input data may be used to determine whether the first path option 304A or the second path option 304B is intended. As one example, if a speed of the machine 204 at its current location in the example of FIG. 3B is too fast such that the rate of deceleration required for the machine 204 to use the first path option 304A would exceed a comfort limit (e.g., 3.5 $m/s^2$), then the intent data 128 may indicate a greater confidence that the left turn signal applies to the sixth road segment 206(6) associated with the second path option 304B. As a second example, if the machine 204 is already decelerating and/or in a lane dedicated to turning left at the first junction 208(1), the intent data 128 may indicate a greater confidence that the left turn signal applies to the third road segment 206(3) associated with the first path option 304A.

Referring back to the example of FIG. 1, the process 100 may include the score component 110 computing one or more scores 130 (e.g., intent scores) for one or more road segments in the environment that may be used as a path for the machine. In some examples, the score component 110 may use the intent data 128 and/or the default path data 126 to compute the score(s) 130. The score(s) 130 may indicate a probability that certain road segments are part of the occupant's intended path of the machine, and the path prediction component 112 may use the score(s) 130 to select road segments for the predicted path of the machine.

In some examples, the score component 110 may determine and/or apply the score(s) 130 to different road segments in different ways based on whether the intent data 128 corresponds to a specific road segment. For instance, the score component 110 may compute confidence scores for the occupant intents. The confidence scores may, in at least some examples, indicate a confidence of whether intent data 128 applies to a specific road segment. Take, for instance, the example of FIG. 3B in which the machine 204 is approaching the first junction 208(1) and the third junction 208(3). At the first junction 208(1), the machine 204 may either (i) turn right, (ii) continue straight along the second road segment 206(2) to the third junction 208(3), or (iii) or turn left onto the third road segment 206(3) associated with the first path option 304A. If the occupant of the machine 204 activates the machine's left turn signal prior to reaching the first junction 208(1), it may be difficult to determine whether the occupant intent (e.g., the left turn signal) should apply to the first junction 208(1) or the third junction 208(3). In other words, based on the turn signal alone, it may be hard to determine whether the occupant intends to turn at the first junction 208(1) or turn at the third junction 208(3), as illustrated by the two potential path options 304A and 304B. In such scenarios, the score component 110 may compute confidence scores for whether the occupant intent applies to the third road segment 206(3) associated with the machine 204 turning left at the first junction 208(1) or whether the occupant intent applies to the sixth road segment 206(6) associated with the machine 204 turning left at the third junction 208(3). The score component 110 may then apply the confidence scores to the score(s) 130 for the different road segments, so that the intent is applied to each road segment but potentially in different proportions. For instance, if the speed of the machine 204 is high and decelerating to turn at the first junction 208(1) may be difficult, the score component 110 may assign a higher confidence score to the intent score for the sixth road segment 206(6) associated with the machine 204 turning at the third junction 208(3).

Additionally, in some examples, the score component 110 may apply multiple score(s) 130 associated with occupant intent to multiple road segments being evaluated as options for the predicted path, as well as aggregate the scores over multiple frames/instances. For example, consider a junction that is associated with a first road segment for continuing straight and a second road segment for turning right at the junction. If the intent component 108 detects a right turn signal of the machine has been activated, the score component 110 may apply a first intent score to the second road segment associated with turning right. If the intent component 108 also detects the machine is in a dedicated right-turn lane, the score component 110 may apply a second intent score to the second road segment. The score component 110 may add the first intent score and the second intent score together, and if the aggregated intent score for the second road segment is greater than for the first road segment, the path prediction component 112 may predict the path of the machine to include the second road segment.

Additionally, as the intent component 108 obtains additional and/or new inputs and generates additional and/or new intent data 128, the score component 110 may use the new intent data 128 to compute the intent scores again for each of the road segments and aggregate the new intent scores with the previous intent scores, creating a running total. For example, individual intent scores for each road segment may be combined to obtain a total score. In some instances, the score component 110 may implement a maximum score that can be added from one intent to affect to the total score for a road segment. For instance, because intents can vary in duration and scores are aggregated across frames, intents with the longer durations can become the dominant intents when it comes to path prediction. Thus, to combat this issue, the score component 110 may set thresholds for maximum amounts a score for a certain intent can reach.

In some examples, the score component 110 may apply different weights or priorities to certain occupant intents. For instance, the score component 110 may assign greater values to certain intent scores of the score(s) 130 based on the underlying context. As an example, a yaw rate or turn signal of the machine may have a higher priority for indicating occupant intent than the machine being located within a dedicated turn lane. For instance, drivers may sometimes mistakenly enter a designated turn lane and activate their turn signal to change lanes, so the score component 110 may give the turn signal a higher priority for indicating occupant intent. In some examples, to give one occupant intent higher priority than another occupant intent, the score component 110 may assign higher values to the scores for the higher priority intents.

In some examples, the score(s) 130 computed by the score component 110 may correspond to a probability distribution for the road segments, where the probability distribution indicates which road segments have a highest probability of being part of the occupant's intended path for the machine. For instance, FIG. 4 is a visualization of an example probability distribution 402 associated with road segments corresponding to junctions ahead of a machine, in accordance with some embodiments of the present disclosure. The probability distribution 402 may include a plurality of road segments 404A-404N (where "N" represents any number) and a plurality of scores 406A(1)-406N(N) corresponding to a plurality of intents 408(1)-408(N) that apply to each of the road segments 404A-404N. The probability distribution 402 may also include a plurality of aggregated scores 410A-410N for each of the road segments 404A-404N.

In some examples, the probability distribution 402 may be represented or otherwise maintained using a table as shown in the example of FIG. 4. Additionally, or alternatively, other data structures may be used. The fields corresponding to the road segments 404A-404N may include, in some examples, an identifier corresponding to the actual, physical road segment the rows of the probability distribution 402 correspond to. The fields corresponding to the intents 408(1)-408(N) may include, in some instances, the type of occupant intent that each of the scores 406A(1)-406N(N) correspond to. For instance, the first column of the probability distribution 402 for the first intent 408(1) may include intent scores for a yaw rate of the machine, the second column of the probability distribution 402 for the second intent 408(2) may include intent scores for a turn signal of the machine, and so forth. That is, and for the first road segment 404A the score 406A(1) may include the score value for yaw rate of the machine that may be applicable to the first road segment

404A (e.g., 0-10), while the score 406A(2) may include the score value for the turn signal of the machine that may be applicable to the first road segment 404A (e.g., 0-10). In some examples, the intent scores may be applicable to multiple of the road segments 404A-404N. For example, if the turn signal of the machine is activated, a respective intent score may be computed and/or applied to a plurality of the road segments. In such a case, and as an example, if the turn signal is applicable to the road segments 404A, 404C, and 404F, then the scores 406A(2), 406C(2), and 406F(2) may each include some score value (e.g., non-zero value).

In some examples, the aggregated scores 410A-410N may include values corresponding to a summation and/or temporal aggregation of the scores 406A(1)-406N(N) over one or multiple frames (e.g., over a period of time). The aggregated score 410A may correspond to summation or aggregation of the scores 406A(1)-406A(N), the aggregated score 410B may correspond to a summation or aggregation of the scores 406B(1)-406B(N), and so forth. As an example, assume that the scores 406(1)-406A(N) for the road segment 404A included the following values, respectively: 1, 3, 0, 0, 5, . . . , and 2. In this example, the aggregated score 410A for the road segment 404A may include a value of 11. Additionally, assume that after obtaining additional intent data during the next frame, the scores 406(1)-406A(N) are updated to 2, 5, 0, 0, 10, . . . , and 3. In this example, the aggregated score 410A may include a value of 20.

In various examples, and with reference to both of FIGS. 1 and 4, the path prediction component 112 may use the aggregated scores 410A-410N to predict the path of the machine, which may be represented using the path prediction data. For instance, the path prediction component 112 may select the road segments that have the highest aggregated scores 410A-410N to be included as the predicted path of the machine.

In some examples, the path prediction component 112 may select the road segment(s) in a descending order based on the order in which the machine is approaching the junction(s). For instance, the path prediction component 112 may first select a first road segment corresponding to a first junction, which may be the closest or next junction. The path prediction component 112 may then select a second road segment corresponding to a second junction, which may be the next junction following the first junction and the first road segment, and so forth until the predicted path is determined. Additionally, in some instances, once no junctions and/or road segments remain that are in range, the path prediction component 112 may use the default path data 126 to determine any remaining portions of the predicted path following the in-range junctions and/or road segments.

Figure 3C:
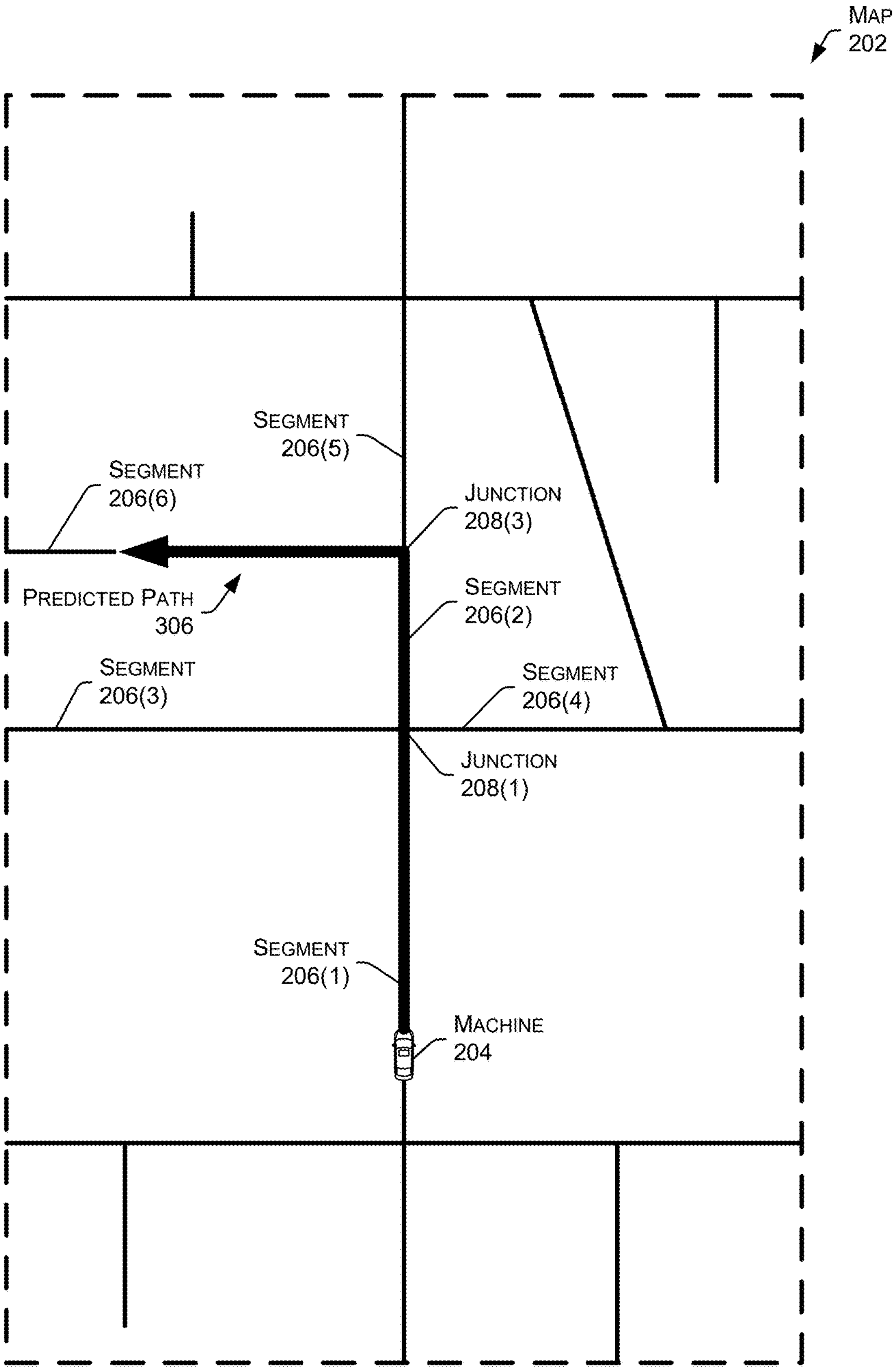
FIG. 3C illustrates an example of a predicted path of the machine, in accordance with some embodiments of the present disclosure.

For instance, FIG. 3C illustrates an example of a predicted path 306 of the machine 204, in accordance with some embodiments of the present disclosure. The predicted path 306 may correspond to the second path option 304B in the example of FIG. 3B and, in some instances, the path prediction component 112 may use the score(s) 130 to determine the predicted path 306. The predicted path 306 illustrated in the example of FIG. 3C includes the first road segment 206(1), the second road segment 206(2), and the sixth road segment 206(6). When determining the road segments of the predicted path 306, the path prediction component 112 may first determine, for the first junction 208(1), which road segment has the highest intent score. For instance, the path prediction component 112 may compare the intent scores between the second road segment 206(2), the third road segment 206(3), and the fourth road segment 206(4). The path prediction component 112, in the example of FIG. 3C, may select the second road segment 206(2) for the predicted path 306 based on its aggregate intent score being the highest. Next, the path prediction component 112 may determine, for the third junction 208(3), which road segment has the highest intent score. For instance, the path prediction component 112 may compare the intent scores between the fifth road segment 206(5) and the sixth road segment 206(6). The path prediction component 112, in the example of FIG. 3C, may select the sixth road segment 206(6) for the predicted path 306 based on its aggregate intent score being the highest. If the next junction (not shown) is out of range, then the path prediction component 112 may use the default path data 126 to determine any remaining portions of the predicted path 306 following the sixth road segment 206(6).

Referring back to the example of FIG. 1, the process 100 may include the drive stack 104 receiving the path prediction data 132. In some examples, the path prediction data 132 may include or otherwise indicate one or more road transition types (e.g., an array illustrating how each road segment in the predicted path is linked, indicating either a turn or a straight connection), one or more route input statuses (e.g., revealing whether a navigation route has been established and/or whether the predicted path adheres to this route), one or more map identifiers (e.g., to ensure that downstream systems or components are using the same map as the path prediction system(s)), one or more map timestamps (e.g., timestamps for when the map is generated), one or more lane graph timestamps, and/or one or more predicted lane graphs rails.

In some examples, the drive stack 104 may include various systems, components, layers, and/or modules that are not shown in the example of FIG. 1. For instance, the drive stack 104 may include a perception component, a map component, a planning component, a control component, an actuation component, and/or other components corresponding to additional and/or alternative layers of the drive stack 104. The drive stack 104 may correspond to the machine, such as the machine 204 and/or the machine 900 described herein.

In some examples, the drive stack 104 may use the path prediction data 132 as inputs for performing one or more additional operations associated with the machine. As an example, the drive stack 104 may use the path prediction data 132 to determine road curvature and fuse the curvature of the machine's trajectory at the junctions and, in some instances, recompute curvatures already provided in map data based on the predicted path. As another example, the drive stack 104 may use the path prediction data 132 to perform localization using the predicted path to determine which road segment the machine is operating on. As yet another example, the drive stack 104 may use the path prediction data 132 to access map data attributes along the predicted path to resolve speed limit conflicts with perception results. In even further examples, the drive stack 104 may use the path prediction data 132 to obtain events, such as T junctions and toll booths, along the predicted path.

In various examples, the drive stack 104 may cause the machine to perform one or more operations based at least on the path prediction data 132. For instance, the drive stack 104 may use the predicted path, curvatures, speed limits, etc.—all of which may be included in and/or determined using the path prediction data 132—to determine whether additional braking or acceleration is needed for the machine. As one example, the predicted path may indicate the machine is merging onto a highway or freeway, and the drive stack 104 (e.g., a planning component or a control component of the drive stack 104) may apply additional acceleration to bring the machine up to speed for the merge. As another example, the predicted path may indicate the machine is going to make a sudden turn, and the drive stack 104 may apply additional braking to ensure the machine makes the turn at a comfortable and/or safe speed.

Figure 5:
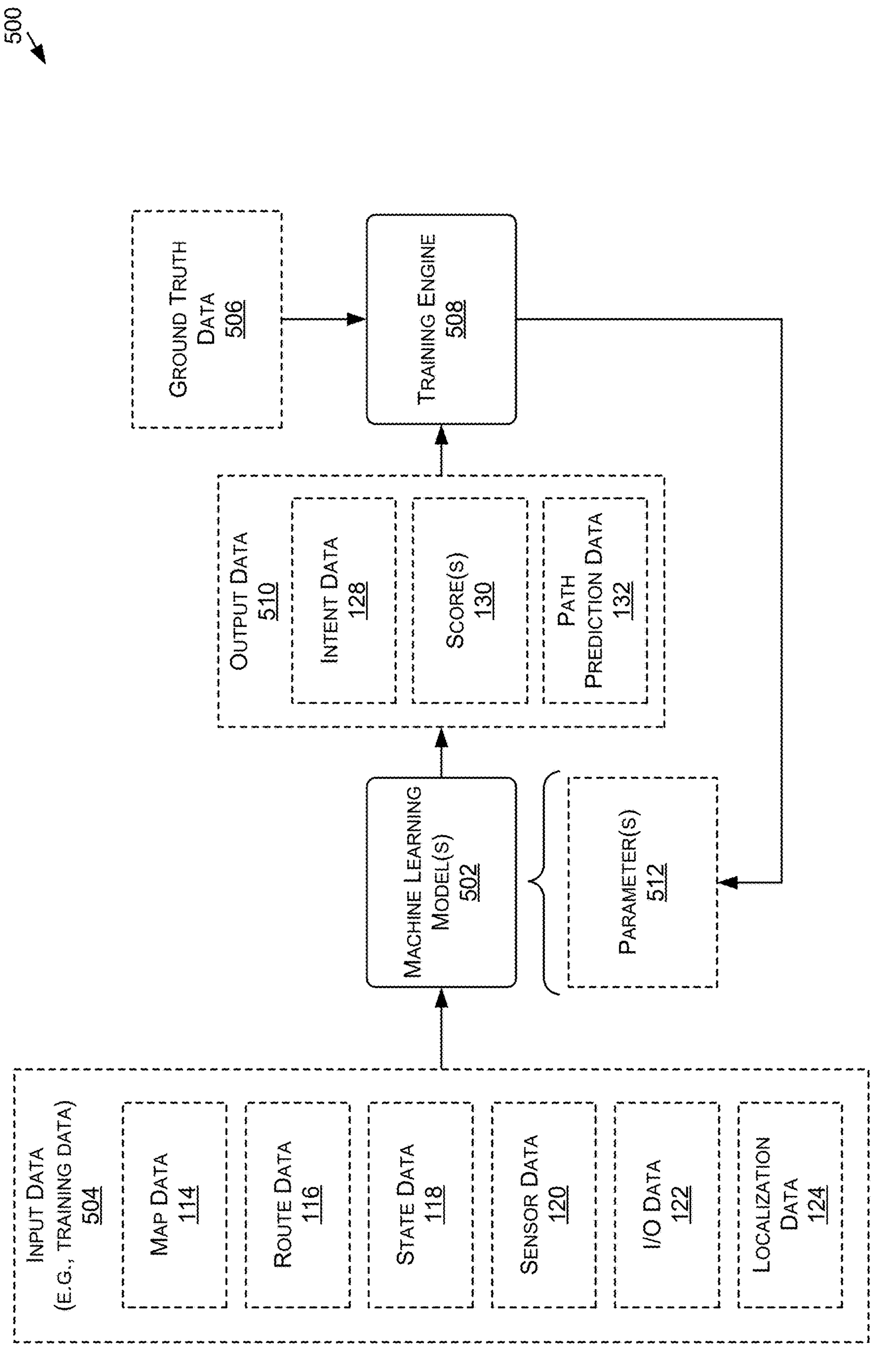
FIG. 5 is a data flow diagram illustrating an example of a process for training one or more machine learning models to predict intended machine paths, in accordance with some embodiments of the present disclosure.

Referring now to FIG. 5, FIG. 5 is a data flow diagram illustrating an example of a process 500 for training one or more machine learning models 502 to predict intended machine paths, in accordance with some embodiments of the present disclosure. For instance, the machine learning model(s) 502 may correspond to the path prediction system(s) 102 and/or one or more of the components of the path prediction system(s) 102, such as the default path component 106, the intent component 108, the score component 110, and/or the path prediction component 112.

As shown, the machine learning model(s) 502 may be trained using various input data 504 (e.g., training input data), which may include one or more of the map data 114, the route data 116, the state data 118, the sensor data 120, the I/O data 122, the localization data 124, and/or any other data described herein, such as the intent data 128, in some instances. In some examples, the input data 504 may include one or more actual (e.g., previously generated and/or stored) versions of the map data 114, the route data 116, the state data 118, the sensor data 120, the I/O data 122, the localization data 124, the intent data 128, etc. Additionally, or alternatively, the input data 504 may be based on the actual versions of the map data 114, the route data 116, the state data 118, the sensor data 120, the I/O data 122, the localization data 124, and/or the intent data. For instance, the input data 504 may include one or more modified versions of the map data 114, the route data 116, the state data 118, the sensor data 120, the I/O data 122, the localization data 124, and/or the intent data 128.

The machine learning model(s) 502 may be trained using the input data 504 as well as corresponding ground truth data 506. The ground truth data 506 may include annotations, labels, masks, and/or the like. For example, in some embodiments, the ground truth data 506 may indicate actual values of parameters associated with a predicted path of a machine, occupant intent, intent scores, and/or the input data 504. For instance, the parameters in the ground truth data 506 may include, but are not limited to, predicted path geometry, predicted lanes, predicted occupant intent values, predicted road segment intent scores, predicted map data, and/or any other parameter. The ground truth data 506 may be generated within a drawing program (e.g., an annotation program), a computer aided design (CAD) program, a labeling program, another type of program suitable for generating the ground truth data 506, and/or may be hand drawn, in some examples. In any example, the ground truth data 506 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

A training engine 508 may use one or more loss functions that measure loss (e.g., error) in output data 510 generated by the machine learning model(s) 502 as compared to the ground truth data 506. The output data 510 may include the intent data 128 indicating predicted occupant intents, the score(s) 130 indicating the probability of a road segment corresponding to an intended path of a machine, the path prediction data 132 indicating predicted machine paths, or any other outputs. In some examples, any type of loss function may be used, such as cross entropy loss, mean squared error, mean absolute error, mean bias error, and/or other loss function types. In some examples, different outputs may have different loss functions. For example, a first predicted occupant intent may include a first loss, a second predicted occupant may include a second loss, a third predicted occupant intent may include a third loss, and/or so forth. In such examples, the loss functions may be combined to form a total loss, and the total loss may be used by the training engine 508 to train the machine learning model(s) 502 by, in some instances, updating a parameter(s) 512 (e.g., weights, biases, etc.) of the machine learning model(s) 502. In any example, backward pass computations may be performed to recursively compute gradients of the loss function(s) with respect to training parameters. In some examples, weights and biases of the machine learning model(s) 502 may be used to compute these gradients.

The machine learning model(s) 502 may use any type of machine learning technologies and/or algorithms. For example, and without limitation, any of the various machine learning models described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, large language model (LLM), vision language model (VLM), multi-modal language model, diffusion, transformer, encoder only, decoder only, encoder-decoder, etc.), and/or other types of machine learning models.

In some examples, the machine learning model(s) 502 may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model 502 (e.g., weights and biases). In some instances, such as where the machine learning model 502 is small enough (e.g., has a small enough number of parameters), the model may be included within the container itself. In some embodiments, the machine learning models 502 described herein may be deployed as an inference microservice to accelerate deployment of models on any cloud, data center, or edge computing system, while ensuring the data is secure. For example, the inference microservice may include one or more APIs, a pre-configured container for simplified deployment, an optimized inference engine (e.g., built using a standardized AI model deployment and execution software, such as NVIDIA's Triton Inference Server, and/or one or more APIs for high performance deep learning inference, which may include an inference runtime and model optimizations that deliver low latency and high throughput for production applications-such as NVIDIA's TensorRT), and/or enterprise management data for telemetry (e.g., including identity, metrics, health checks, and/or monitoring). The machine learning model(s) 502 described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) 502 (e.g., that has been optimized for high performance inference), an inference runtime software to execute the machine learning model(s) 502 and provide outputs/responses to inputs (e.g., user queries, prompts, etc.), and enterprise management software to provide health checks, identity, and other monitoring. In some embodiments, the inference microservice may include software to perform in-place replacement and/or updating to the machine learning model(s) 502. When replacing or updating, the software that performs the replacement/updating may maintain user configurations of the inference runtime software and enterprise management software.

Figure 6:
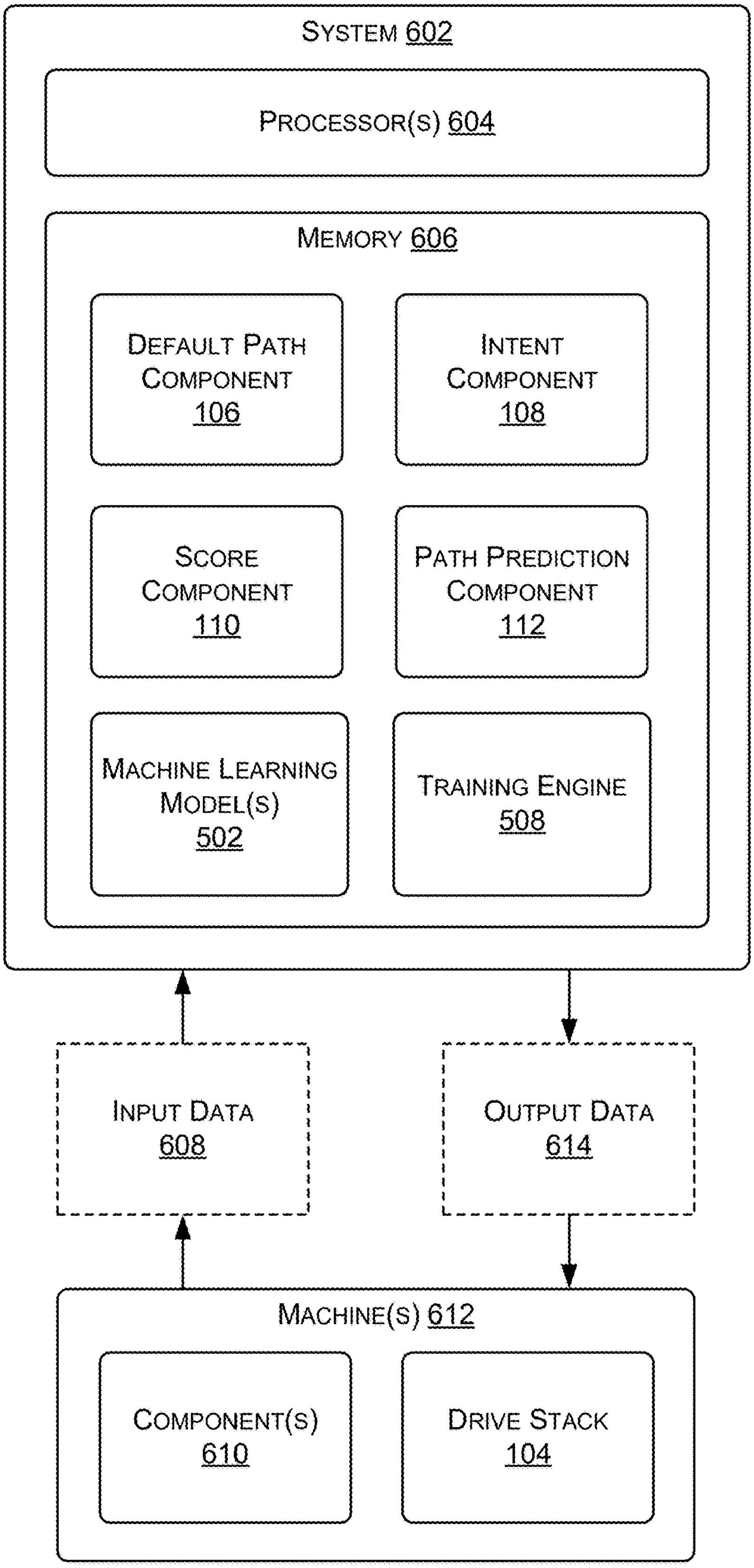
FIG. 6 illustrates an example of a system that may perform one or more of the processes described herein, in accordance with some embodiments of the present disclosure.

Referring now to FIG. 6, FIG. 6 illustrates an example of a system 602 that may perform one or more of the processes described herein, in accordance with some embodiments of the present disclosure. As shown, the system 602 (which may represent, and/or include, the example computing device(s) 1000 and/or the example data center 1100) may include one or more processors 604 (which may be similar to, and/or include, the CPUs 1006 and/or the GPUs 1008) and memory 606 (which may be similar to, and/or include, the memory 1004). For instance, the memory 606 may store one or more of the components of the path prediction system(s) 102, such as the default path component 106, the intent component 108, the score component 110, and the path prediction component 112, as well as the machine learning model(s) 502 and the training engine 508. Additionally, the processor(s) 604 may execute the default path component 106, the intent component 108, the score component 110, and the path prediction component 112, as well as the machine learning model(s) 502 and/or the training engine 508 to perform one or more of the processes described herein.

For instance, the system 602 may receive input data 608 generated by one or more components 610 of one or more machines 612, which may correspond to the machine 204 or the machine 900. The input data 608 may include the map data 114, the route data 116, the state data 118, the sensor data 120, the I/O data 122, the localization data 124, perception data, or any other data. The system 602 may then process and evaluate the input data 608 in order to determine a predicted path of the machine(s) 612. The system 602 may send output data 614, which may include the path prediction data 132 and/or any of the other outputs of the path prediction system(s) 102 described herein. The drive stack 104 of the machine(s) 612 may use the output data 614 to control one or more operations of the machine(s) 612. Although depicted as being separate systems, the system 602 and the machine(s) 612 may, in some examples, be the same or different systems. For instance, the processor(s) 604 and the memory 606 may be part of the machine(s) 612 (e.g., included within a computing device of the machine(s) 612).

Now referring to FIGS. 7 and 8, each block of methods 700 and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 700 and 800 are described, by way of example, with respect to FIG. 1. However, these methods may additionally or alternatively be executed by any one system, or any combination of systems, including, but not limited to, those described herein.

FIG. 7 is a flow diagram illustrating an example of a method 700 for predicting a path of a machine, in accordance with some embodiments of the present disclosure. The method 700, at block B702, may include computing a first plurality of scores indicative of first probabilities that a first plurality of road segments correspond to an intended path of the machine, the first plurality of road segments associated with a first junction. For instance, the score component 110 may compute the score(s) 130, which may be indicative of the first probabilities that the first plurality of road segments correspond to the intended path of the machine. In some examples, the first plurality of scores may be computed based at least on intent data indicating one or more occupant intents with respect to specific road segments of the first plurality of road segments.

The method 700, at block B704, may include computing a second plurality of scores indicative of second probabilities that a second plurality of road segments correspond to the intended path of the machine, the second plurality of road segments associated with a second junction. For instance, the score component 110 may compute the score(s) 130, which may be indicative of the second probabilities that the second plurality of road segments correspond to the intended path of the machine. In some examples, the second plurality of scores may be computed based at least on the intent data indicating one or more occupant intents with respect to specific road segments of the second plurality of road segments.

The method 700, at block B706, may include determining, based at least on the first plurality of scores and the second plurality of scores, a predicted path of the machine that includes at least a first road segment of the first plurality of road segments and a second road segment of the second plurality of road segments. For instance, the path prediction component 112 may generate the path prediction data 132 based at least on the score(s) 130. The path prediction data 132 may indicate the predicted path of the machine, which may include the first road segment of the first plurality of road segments associated with the first junction and the second road segment of the second plurality of road segments associated with the second junction. In some examples, the first road segment may be the highest scoring road segment of the first plurality of road segments and the second road segment may be the highest scoring road segment of the second plurality of road segments.

The method 700, at block B708, may include performing one or more operations associated with the machine based at least on the predicted path. For instance, the drive stack 104 may use the path prediction data 132 to perform one or more operations associated with the machine. In some examples, the operations may include but are not limited to, determining road curvature, fusing road curvature to junctions in map data, performing localization of the machine using the predicted path to determine which road segment the machine is operating on, accessing map data attributes along the predicted path to resolve speed limit conflicts with perception results, obtaining events, such as T junctions and toll booths, along the predicted path, etc. Additionally, in some examples, the drive stack 104 may adjust braking, acceleration, steering angle, etc. of the machine using the predicted path, curvatures, speed limits, etc.—all of which may be included in and/or determined using the path prediction data 132.

FIG. 8 is a flow diagram illustrating an example of a method 800 for using occupant intent to score road segment junctions ahead of a machine, in accordance with some embodiments of the present disclosure. The method 800, at block B802, may include determining, based at least on at least one of map data or perception data, that a location of a machine is within a threshold distance of one or more junctions including one or more options for a predicted path of the machine. For instance, the intent component 108 may use the map data 114 and/or the localization data 124 to determine that the location of the machine is within the threshold distance of the junction(s) including the option(s) for the predicted path. In some examples, the threshold distance may be an actual distance between a location of the machine and a location(s) of the junction, and/or may be a period of time associated with the machine arriving at the location(s) of the junctions (e.g., 5 seconds, 8 seconds, etc.). That is, the machine may be within the threshold distance of the junction(s) if the machine will arrive at the junctions within a threshold period of time (e.g., the next 5 seconds). Additionally, in some examples, the intent component 108 may determine one or more occupant intents that may apply to the option(s). In some examples, the option(s) may include one or more road segments the machine may traverse.

The method 800, at block B804, may include computing, based at least on one or more occupant intents corresponding to the plurality of options, a plurality of scores indicative of whether respective options of the plurality of options correspond to an intended path of the machine. For instance, the score component 110 may compute the score(s) 130, which may be indicative of whether the respective option correspond to the intended path of the machine. In some examples, the score(s) may include intent scores determined based at least on the intent data determined by the intent component 108. In some examples, the score(s) may be aggregated over multiple frames, and the highest scoring option(s) may be selected for the predicted path of the machine, which may, preferably, correspond to the intended path of the machine.

The method 800, at block B806, may include determining a predicted path of the machine using the plurality of scores. For instance, the path prediction component 112 may determine the predicted path using the score(s) 130. In some examples, the path prediction component 112 may iteratively select the road segments at each junction having the highest scores. For instance, the path prediction component 112 may select a first, highest scoring road segment at a first junction closest to the machine, then "follow" the first road segment to the next junction and select a second road segment that is the highest scoring road segment for the next junction, and so forth until the predicted path is determined.

The method 800, at block B808, may include performing one or more operations associated with the machine based at least on the predicted path of the machine. For instance, the drive stack 104 may use the path prediction data 132 to perform the operation(s) associated with the machine. In some examples, the operation(s) may include but are not limited to, determining road curvature, fusing road curvature to junctions in map data, performing localization of the machine using the predicted path to determine which road segment the machine is operating on, accessing map data attributes along the predicted path to resolve speed limit conflicts with perception results, obtaining events, such as T junctions and toll booths, along the predicted path, etc. Additionally, in some examples, the drive stack 104 may adjust braking, acceleration, steering angle, etc. of the machine using the predicted path, curvatures, speed limits, etc.—all of which may be included in and/or determined using the path prediction data 132.

Example Autonomous Vehicle

Figure 9A:
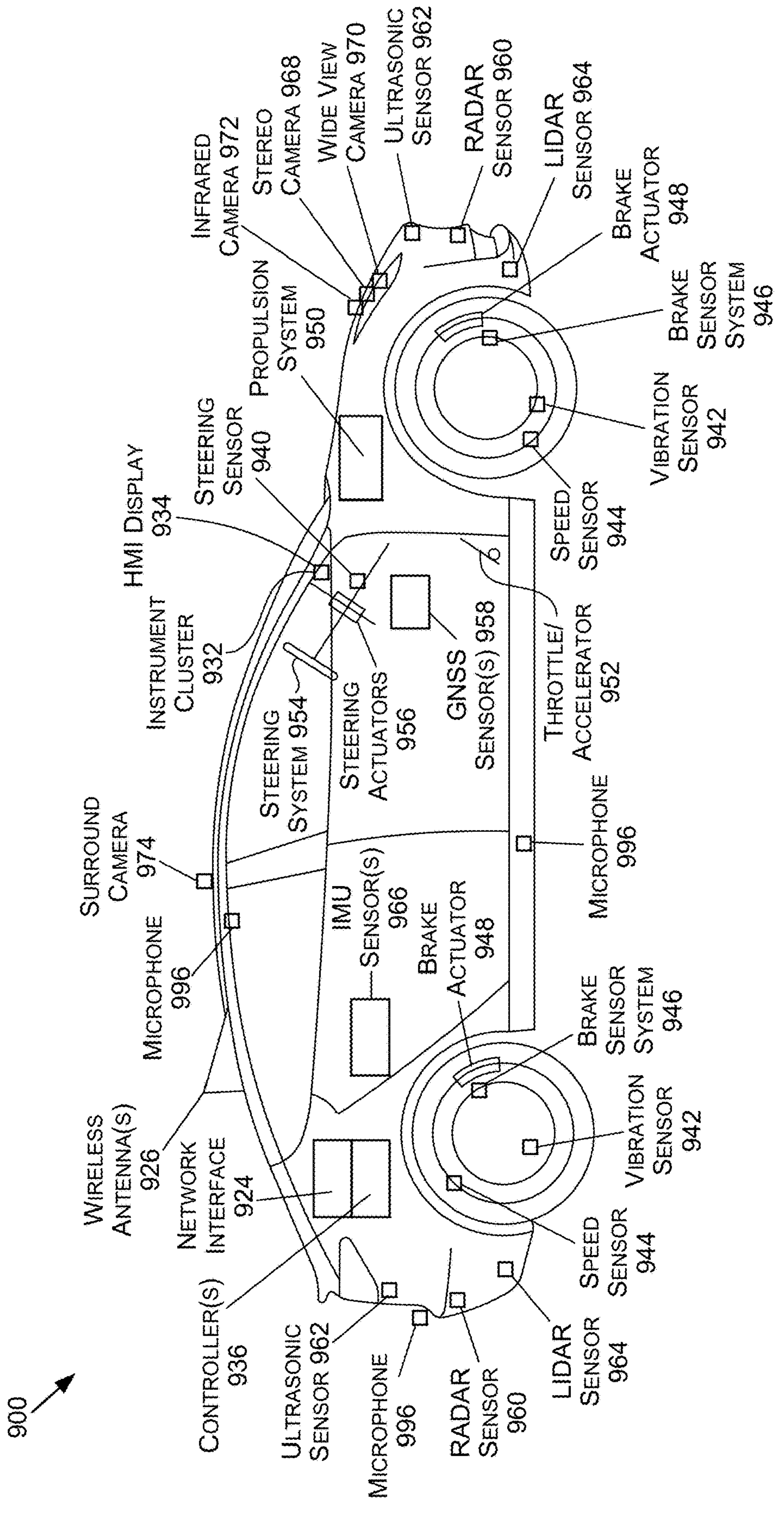
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
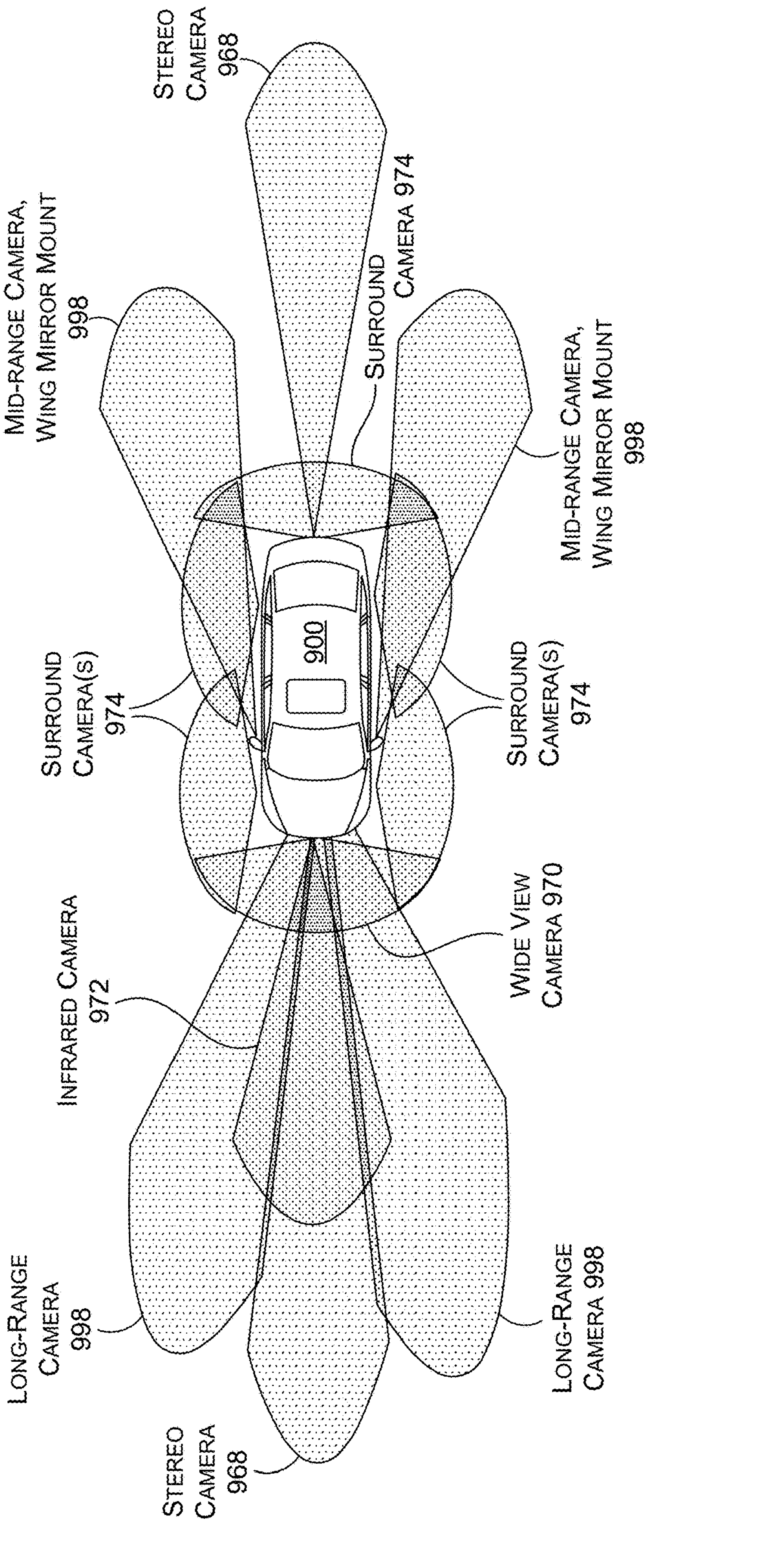
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
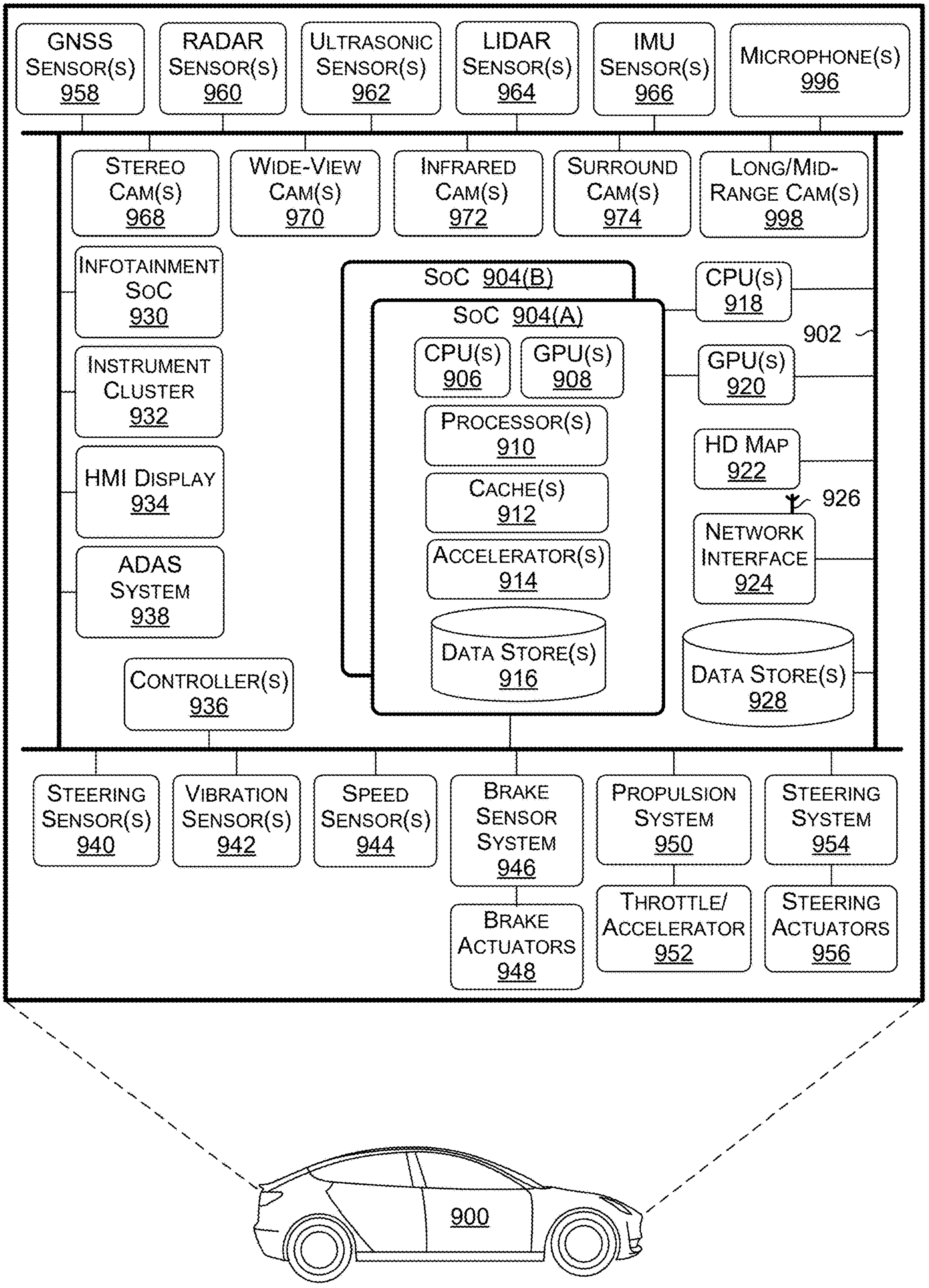
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
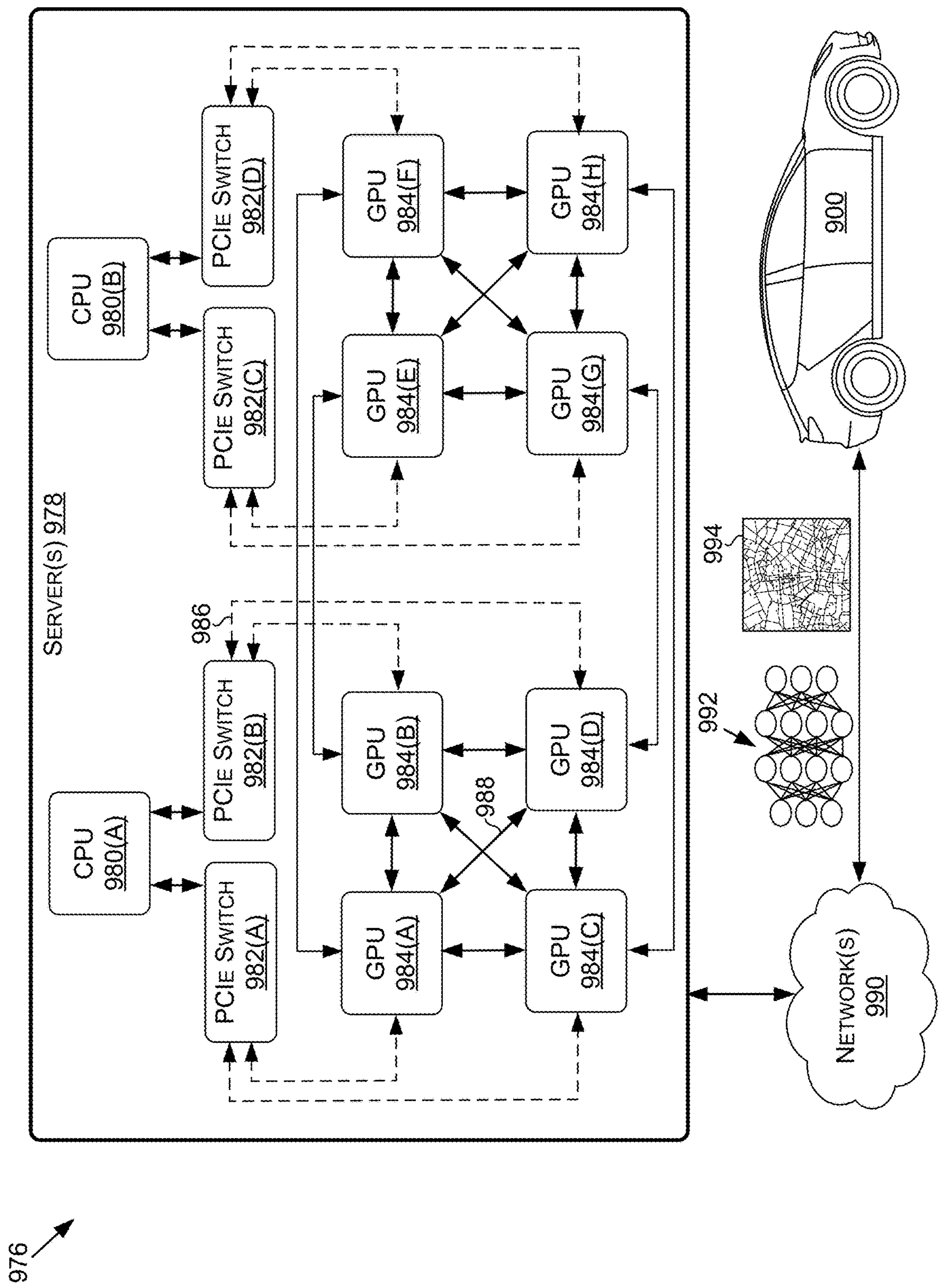
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
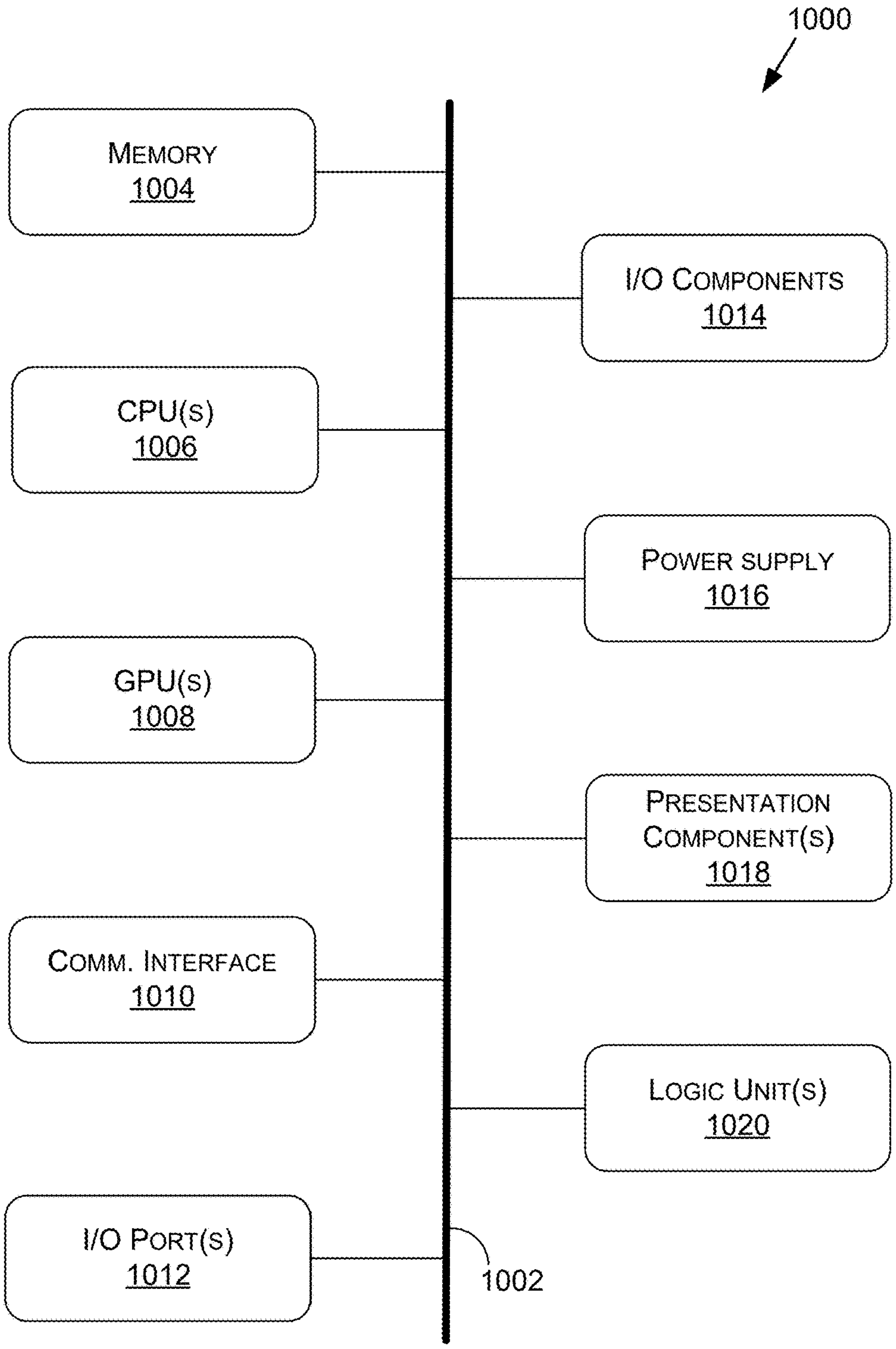
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
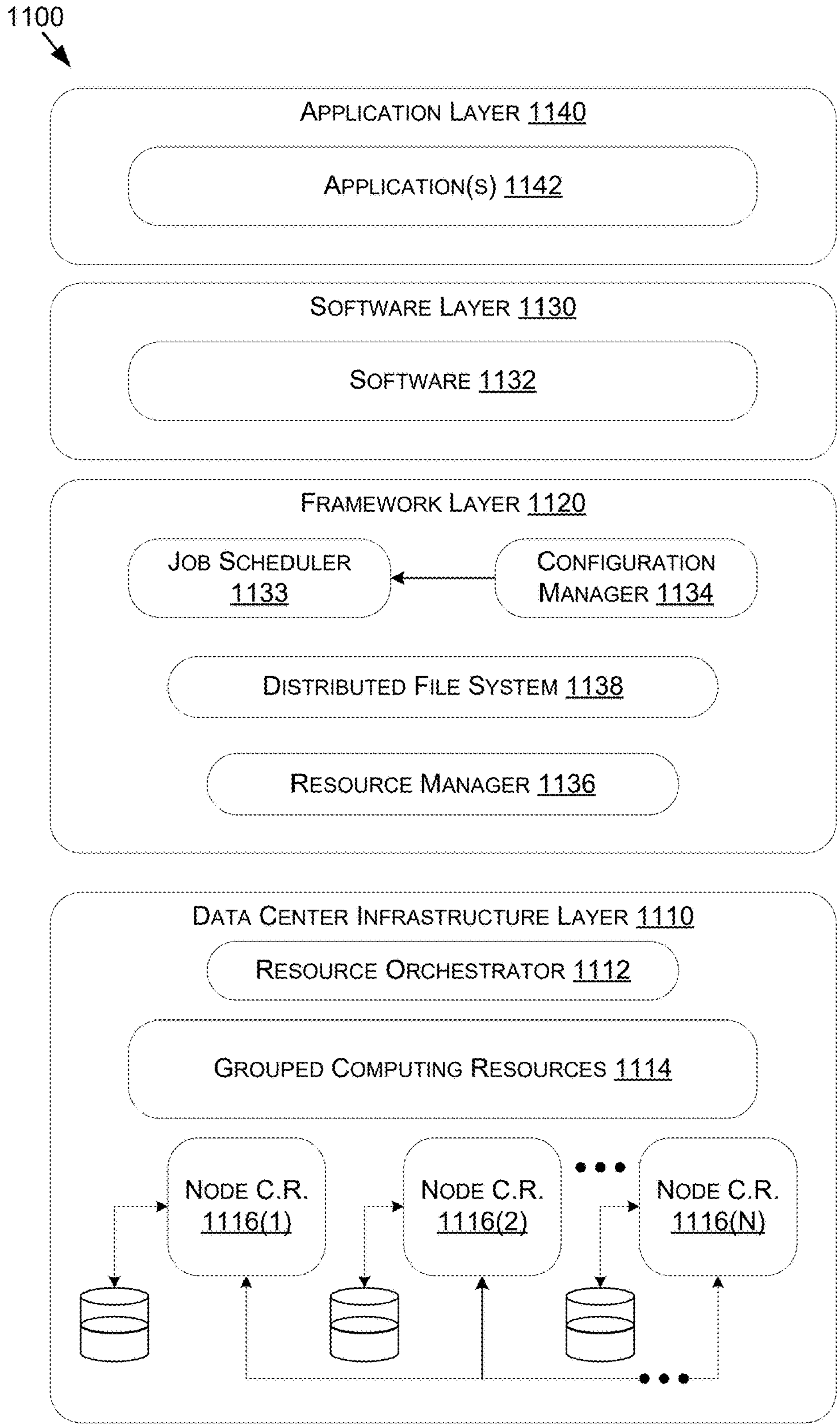
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A. A method comprising: computing, based at least on input data indicative of occupant intent associated with an intended path of a machine, a probability distribution including at least: a first plurality of scores corresponding to a first plurality of road segments associated with a first junction, the first plurality of scores representative of first probabilities that the first plurality of road segments correspond to the intended path of the machine; and a second plurality of scores corresponding to a second plurality of road segments associated with a second junction, the second plurality of scores representative of second probabilities that the second plurality of road segments correspond to the intended path of the machine; determining, based at least on the first plurality of scores and the second plurality of scores, a predicted path of the machine that includes at least one of a first road segment of the first plurality of road segments or a second road segment of the second plurality of road segments; and performing one or more operations associated with the machine based at least on the predicted path.

B. The method as recited in paragraph A, further comprising: determining, based on at least one of map data or sensor data, that the machine is located within a threshold distance of the first junction and the second junction, wherein the determining of the predicted path of the machine that includes the at least one of the first road segment or the second road segment is further based at least on the machine being located within the threshold distance of the first junction and the second junction.

C. The method as recited in any one of paragraphs A-B, further comprising: determining, based at least on the first plurality of scores, that the first road segment is a highest scoring road segment of the first plurality of road segments; and determining, based at least on the second plurality of scores, that the second road segment is the highest scoring road segment of the second plurality of road segments, wherein the predicted path of the machine including the at least one of the first road segment or the second road segment is based at least on the first road segment being the highest scoring road segment of the first plurality of road segments and based at least on the second road segment being the highest scoring road segment of the second plurality of road segments.

D. The method as recited in any one of paragraphs A-C, further comprising: obtaining, over a period of time, second input data indicative of the occupant intent associated with the intended path of the machine; updating, over the period of time and based at least on the second input data, the first plurality of scores and the second plurality of scores; and determining the predicted path of the machine based at least on the updating of the first plurality of scores and the second plurality of score.

E. The method as recited in any one of paragraphs A-D, further comprising: computing, for the first plurality of road segments, one or more first intent scores indicating at least whether one or more detected occupant intents correspond to one or more first road segments of the first plurality of road segments; and computing, for the second plurality of road segments, one or more second intent scores indicating at least whether the one or more detected occupant intents correspond to one or more second road segments of the second plurality of road segments, wherein the first plurality of scores and the second plurality of scores are computed based at least on the one or more first intent scores and the one or more second intent scores.

F. The method as recited in any one of paragraphs A-E, wherein the input data includes at least one of: map data representing a map of an environment; localization data indicating a location of the machine with respect to the map of the environment; route data indicating a predefined route of the machine through the environment; preference or behavior data corresponding to one or more prior trips; or state data indicating one or more states associated with one or more components or systems of the machine.

G. A system comprising: one or more processors to: determine, based at least on at least one of map data or perception data, that a location of a machine is within a threshold distance of one or more junctions including a plurality of options for a path of the machine; compute, based at least on one or more occupant intents corresponding to the plurality of options, a plurality of scores indicative of whether respective options of the plurality of options correspond to an intended path of the machine; determine a predicted path of the machine using the plurality of scores; and perform one or more operations associated with the machine based at least on the predicted path of the machine.

H. The system as recited in paragraph G, wherein at least a subset of the plurality of options correspond to one or more road segments associated with the one or more junctions, the one or more processors further to select at least a first road segment of the one or more road segments for the predicted path of the machine.

I. The system as recited in any one of paragraphs G-H, the one or more processors further to determine that a period of time associated with the machine arriving at the one or more junctions is less than a threshold period of time, wherein the determination that the location of the machine is within the threshold distance of the one or more junctions is based at least on the period of time being less than the threshold period of time.

J. The system as recited in any one of paragraphs G-I, the one or more processors further to compute one or more confidence scores associated with the one or more occupant intents, wherein the computation of the plurality of scores is further based at least on the one or more confidence scores.

K. The system as recited in any one of paragraphs G-J, wherein the one or more occupant intents include at least one of: a yaw rate associated with the machine; a state of a turn signal associated with the machine; a lane change associated with the machine; a lane assignment associated with the machine; a presence of an arrow mark in a lane used by the machine; or a steering angle associated with the machine.

L. The system as recited in any one of paragraphs G-K, wherein the predicted path of the machine at least partially corresponds to the intended path of the machine and the determination of the predicted path comprises determining, using the plurality of scores, a subset of the respective options having a highest score from amongst the plurality of options for the one or more junctions.

M. The system as recited in any one of paragraphs G-L, wherein the computation of the plurality of scores comprises computing the plurality of scores over a period of time based at least on a temporal series of the one or more occupant intents corresponding to the plurality of options.

N. The system as recited in any one of paragraphs G-M, the one or more processors further to: compute, for a first option of the plurality of options, a first plurality of intent scores based at least on a first plurality of occupant intents corresponding to the first option; compute, for one or more second options of the plurality of options, a second plurality of intent scores based at least on a second plurality of occupant intents corresponding to the one or more second options; compute, using the first plurality of intent scores, a first score of the plurality of scores, the first score indicative of whether the first option corresponds to the intended path of the machine; and compute, using the second plurality of intent scores, one or more second scores of the plurality of scores indicative of whether the one or more second options correspond to the intended path of the machine.

O. The system as recited in any one of paragraphs G-N, wherein one or more occupant intents of the first plurality of occupant intents are included in the second plurality of occupant intents.

P. The system as recited in any one of paragraphs G-O, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

Q. One or more processors comprising: processing circuitry to evaluate, within a simulation rendered using one or more light transport simulation algorithms, one or more path prediction algorithms for predicting an intended path of a machine in an environment using a probability distribution associated with a plurality of options for the intended path of the machine, the probability distribution including a plurality of scores indicative of whether respective options of the plurality of options correspond to the intended path of the machine.

R. The one or more processors as recited in paragraph Q, wherein the probability distribution is generated based at least on: detecting one or more occupant intents corresponding to the respective options of the plurality of options; computing, for the respective options, respective intent scores based at least on the one or more occupant intents; and aggregating the respective intent scores to compute, for the respective options, respective scores of the plurality of scores.

S. The one or more processors as recited in any one of paragraphs Q-R, wherein the simulation is generated, at least in part, using a three-dimensional (3D) content collaboration platform for 3D assets.

T. The one or more processors as recited in any one of paragraphs Q-S, wherein the 3D content collaboration platform for 3D assets uses universal scene descriptor (USD) data for managing one or more attributes of a simulated environment associated with the simulation.

What is claimed is:

1. A method comprising:

generating, based at least on input data indicative of occupant intent associated with an intended path of a machine in an environment, a probability distribution including at least:

a first plurality of scores corresponding to a first plurality of road segments connected to a first junction, the first plurality of scores representative of first probabilities that the first plurality of road segments correspond to the intended path of the machine; and a second plurality of scores corresponding to a second plurality of road segments connected to a second junction, the second plurality of scores representative of second probabilities that the second plurality of road segments correspond to the intended path of the machine;

determining, based at least on the first plurality of scores and the second plurality of scores, a predicted path of the machine that includes at least one of a first road segment of the first plurality of road segments or a second road segment of the second plurality of road segments; and performing, based at least on the predicted path, one or more planning or control operations to cause the machine to navigate within the environment.

2. The method of claim 1, further comprising:

determining, based on at least one of map data or sensor data, that the machine is located within a threshold distance of the first junction and the second junction, wherein the determining of the predicted path of the machine that includes the at least one of the first road segment or the second road segment is further based at least on the machine being located within the threshold distance of the first junction and the second junction.

3. The method of claim 1, further comprising:

determining, based at least on the first plurality of scores, that the first road segment is a highest scoring road segment of the first plurality of road segments; and determining, based at least on the second plurality of scores, that the second road segment is the highest scoring road segment of the second plurality of road segments, wherein the predicted path of the machine including the at least one of the first road segment or the second road segment is based at least on the first road segment being the highest scoring road segment of the first plurality of road segments and based at least on the second road segment being the highest scoring road segment of the second plurality of road segments.

4. The method of claim 1, further comprising:

obtaining, over a period of time, second input data indicative of the occupant intent associated with the intended path of the machine;

updating, over the period of time and based at least on the second input data, the first plurality of scores and the second plurality of scores; and determining the predicted path of the machine based at least on the updating of the first plurality of scores and the second plurality of score.

5. The method of claim 1, further comprising:

computing, for the first plurality of road segments, one or more first intent scores indicating at least whether one or more detected occupant intents correspond to one or more first road segments of the first plurality of road segments; and computing, for the second plurality of road segments, one or more second intent scores indicating at least whether the one or more detected occupant intents correspond to one or more second road segments of the second plurality of road segments, wherein the first plurality of scores and the second plurality of scores are computed based at least on the one or more first intent scores and the one or more second intent scores.

6. The method of claim 1, wherein the input data includes at least one of:

map data representing a map of an environment;

localization data indicating a location of the machine with respect to the map of the environment;

route data indicating a predefined route of the machine through the environment;

preference or behavior data corresponding to one or more prior trips; or state data indicating one or more states associated with one or more components or systems of the machine.

7. The method of claim 1, wherein:

the intended path is an occupant-intended path through a plurality of upcoming junctions ahead of the machine, the first junction is a first upcoming junction of the plurality of upcoming junctions, and the second junction is a second upcoming junction of the plurality of upcoming junctions that follows the first upcoming junction.

8. A system comprising:

one or more processors to:

determine that a location of a machine is within a threshold distance of one or more junctions ahead of the machine, the one or more junctions including a plurality of options for an intended path of the machine;

based at least on the machine being located within the threshold distance of the one or more junctions, compute one or more confidence scores indicating whether one or more detected occupant intents correspond to respective options of the plurality of options;

compute, based at least on the one or more detected occupant intents and the one or more confidence scores, a plurality of scores indicative of whether the respective options of the plurality of options correspond to an intended path of the machine;

determine a predicted path of the machine using the plurality of scores; and perform, based at least on the predicted path of the machine, one or more planning or control operations associated with the machine navigating within an environment.

9. The system of claim 8, wherein at least a subset of the plurality of options correspond to one or more road segments associated with the one or more junctions, the one or more processors further to select at least a first road segment of the one or more road segments for the predicted path of the machine.

10. The system of claim 8, the one or more processors further to determine that a period of time associated with the machine arriving at the one or more junctions is less than a threshold period of time, wherein the determination that the location of the machine is within the threshold distance of the one or more junctions is based at least on the period of time being less than the threshold period of time.

11. The system of claim 8, wherein the one or more occupant intents include at least one of:

a yaw rate associated with the machine;

a state of a turn signal associated with the machine;

a lane change associated with the machine;

a lane assignment associated with the machine;

a presence of an arrow mark in a lane used by the machine; or a steering angle associated with the machine.

12. The system of claim 8, wherein the predicted path of the machine at least partially corresponds to the intended path of the machine and the determination of the predicted path comprises determining, using the plurality of scores, a subset of the respective options having a highest score from amongst the plurality of options for the one or more junctions.

13. The system of claim 8, wherein the computation of the plurality of scores comprises computing the plurality of scores over a period of time based at least on a temporal series of the one or more occupant intents corresponding to the plurality of options.

14. The system of claim 8, the one or more processors further to:

compute, for a first option of the plurality of options, a first plurality of intent scores based at least on a first plurality of occupant intents corresponding to the first option;

compute, for one or more second options of the plurality of options, a second plurality of intent scores based at least on a second plurality of occupant intents corresponding to the one or more second options;

compute, using the first plurality of intent scores, a first score of the plurality of scores, the first score indicative of whether the first option corresponds to the intended path of the machine; and compute, using the second plurality of intent scores, one or more second scores of the plurality of scores indicative of whether the one or more second options correspond to the intended path of the machine.

15. The system of claim 14, wherein one or more occupant intents of the first plurality of occupant intents are included in the second plurality of occupant intents.

16. The system of claim 8, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

17. One or more processors comprising:

processing circuitry to evaluate, within a simulation rendered using one or more light transport simulation algorithms, one or more path prediction algorithms for predicting an intended path of a machine in an environment using a probability distribution associated with a plurality of options for the intended path of the machine, the probability distribution including a plurality of scores indicative of whether respective options of the plurality of options correspond to the intended path of the machine.

18. The one or more processors of claim 17, wherein the probability distribution is generated based at least on:

detecting one or more occupant intents corresponding to the respective options of the plurality of options;

computing, for the respective options, respective intent scores based at least on the one or more occupant intents; and aggregating the respective intent scores to compute, for the respective options, respective scores of the plurality of scores.

19. The one or more processors of claim 18, wherein the simulation is generated, at least in part, using a three-dimensional (3D) content collaboration platform for 3D assets.

20. The one or more processors of claim 19, wherein the 3D content collaboration platform for 3D assets uses universal scene descriptor (USD) data for managing one or more attributes of a simulated environment associated with the simulation.

* * * * *